US011993504B2

(12) United States Patent
Carson et al.

(10) Patent No.: US 11,993,504 B2
(45) Date of Patent: May 28, 2024

(54) BEVERAGE DISPENSING UNIT

(71) Applicant: Modern Dispense, LLC, Cleveland, OH (US)

(72) Inventors: Justin Carson, Cleveland, OH (US); Joe Balish, Fairview, OH (US); Christopher Armenio, Cleveland, OH (US); Michael Dougherty, Cleveland, OH (US); Jason Kocher, Chardon, OH (US); Adam Fishman, Cleveland, OH (US); Shaun Lynch, Westlake, OH (US)

(73) Assignee: Modern Dispense, LLC, Cleveland, OH (US)

( * ) Notice: Subject to any disclaimer, the term of this patent is extended or adjusted under 35 U.S.C. 154(b) by 0 days.

(21) Appl. No.: 17/838,930

(22) Filed: Jun. 13, 2022

(65) Prior Publication Data

US 2023/0119340 A1 Apr. 20, 2023

Related U.S. Application Data

(60) Provisional application No. 63/257,816, filed on Oct. 20, 2021.

(51) Int. Cl.
*B67D 1/00* (2006.01)
*B67D 1/08* (2006.01)
*B67D 1/12* (2006.01)

(52) U.S. Cl.
CPC ......... *B67D 1/0036* (2013.01); *B67D 1/0888* (2013.01); *B67D 1/1204* (2013.01); *B67D 2210/00086* (2013.01)

(58) Field of Classification Search
CPC .. B67D 1/0036; B67D 1/0888; B67D 1/1204; B67D 2210/00086; B67D 1/0021; B67D 1/0043; B67D 1/0044; B67D 1/0046
See application file for complete search history.

(56) References Cited

U.S. PATENT DOCUMENTS 3,441,176 A * 4/1969 Reynolds ............ B67D 1/0036 261/DIG. 7
3,790,028 A * 2/1974 Gardner, Jr. ......... B67D 1/0021 222/129.4

(Continued)

FOREIGN PATENT DOCUMENTS

EP 2891622 A1 7/2015

*Primary Examiner* — Donnell A Long
(74) *Attorney, Agent, or Firm* — Tucker Ellis LLP

(57) ABSTRACT

A beverage dispensing unit includes a dispensing valve configured to be fluidly coupled to at least one beverage source, one or more ingredient pumps configured to be fluidly coupled to one or more ingredient sources, a dispensing manifold fluidly coupled to the dispensing valve and the one or more ingredient pumps, and a controller. The controller is configured to receive a recipe from a user, wherein the recipe indicates an amount of each ingredient of one or more ingredient sources. The controller is further configured to operate the one or more ingredient pumps to inject one or more of the ingredients into the dispensing manifold according to the recipe, and open the dispensing valve to allow a volume of beverage from the beverage source to flow through the dispensing manifold. The volume of beverage mixes with the one or more ingredients in the manifold and flushes the ingredients out of the manifold.

20 Claims, 18 Drawing Sheets

(56) References Cited

U.S. PATENT DOCUMENTS

| | | | | |
|---|---|---|---|---|
| 4,566,287 | A * | 1/1986 | Schmidt | B67D 1/1286<br>62/390 |
| 5,473,909 | A * | 12/1995 | Kateman | A23G 9/04<br>366/177.1 |
| 2007/0205220 | A1 | 9/2007 | Rudick | |
| 2013/0277394 | A1* | 10/2013 | Edwards | B67D 1/0891<br>222/144.5 |
| 2014/0114469 | A1* | 4/2014 | Givens | B67D 1/0041<br>222/23 |
| 2014/0209634 | A1* | 7/2014 | Metropulos | B67D 1/0041<br>222/608 |
| 2015/0315006 | A1 | 11/2015 | Ziesel | |
| 2016/0368753 | A1 | 12/2016 | Bethuy | |
| 2018/0035839 | A1* | 2/2018 | Buchholz | A47J 31/42 |
| 2018/0038534 | A1* | 2/2018 | Jaeger | A47G 21/185 |
| 2019/0152759 | A1* | 5/2019 | Renzi | B67D 1/0884 |
| 2019/0217256 | A1* | 7/2019 | Fantappie | B01F 25/45241 |
| 2019/0330043 | A1* | 10/2019 | Carpenter | B67D 1/0051 |
| 2020/0122100 | A1* | 4/2020 | Tumey | B01F 23/23121 |
| 2023/0038010 | A1 | 2/2023 | Mjelde et al. | |

* cited by examiner

BEVERAGE DISPENSING UNIT

CROSS-REFERENCE TO RELATED APPLICATIONS

This application claims priority to and the benefit of U.S. Provisional Application No. 63/257,816, filed on Oct. 20, 2021, the entirety of which is incorporated herein by reference.

TECHNICAL FIELD

In general, the present invention relates to a beverage dispensing apparatus and method.

BACKGROUND OF THE INVENTION

Both alcoholic and non-alcoholic seltzers have gained in popularity throughout the past several years. Seltzers containing a variety of different flavors and ingredients are available to consumers to purchase from stores and in bar and restaurant establishments. A more interactive and customizable method of creating and dispensing such beverages may be desirable.

SUMMARY OF THE INVENTION

In accordance with an embodiment of the present invention, a beverage dispensing unit is provided including: a dispensing valve configured to be fluidly coupled to at least one beverage source, one or more ingredient pumps configured to be fluidly coupled to one or more ingredient sources, wherein each of the one or more ingredient pumps is configured to pump a corresponding ingredient from a corresponding ingredient source, a dispensing manifold fluidly coupled to the dispensing valve and the one or more ingredient pumps, and a controller. The controller is configured to receive a recipe from a user, wherein the recipe indicates an amount of each ingredient of the one or more ingredient sources, operate the one or more ingredient pumps to inject one or more of the ingredients into the dispensing manifold according to the recipe, and open the dispensing valve to allow a volume of beverage from the beverage source to flow through the dispensing manifold, wherein the volume of beverage mixes with the one or more ingredients in the manifold and flushes the ingredients out of the manifold.

According to aspects of the disclosure, a beverage dispensing system includes one or more ingredient pumps configured to be fluidly coupled to one or more ingredient sources. Each of the one or more ingredient pumps is configured to pump a corresponding ingredient from a corresponding ingredient source. The beverage dispensing system further includes a dispensing manifold fluidly coupled to the one or more ingredient pumps and a controller configured to receive a recipe from a user, the recipe indicating an amount of each ingredient of the one or more ingredient sources, and operate the one or more ingredient pumps to inject one or more of the ingredients into the dispensing manifold according to the recipe.

According to one embodiment of the beverage dispensing system, the dispensing manifold comprises a first end configured to be coupled with a shank and a second end configured to be coupled with a faucet.

According to one embodiment of the beverage dispensing system, the dispensing manifold is configured to be retrofitted to an existing beverage tap that includes the shank and the faucet.

According to one embodiment of the beverage dispensing system, the beverage dispensing system includes a dispensing valve configured to be fluidly coupled to at least one beverage source and the dispensing manifold.

According to one embodiment of the beverage dispensing system, the controller is further configured to open the dispensing valve to allow a volume of beverage from the beverage source to flow through the dispensing manifold, wherein the volume of beverage mixes with the one or more ingredients in the manifold and flushes the ingredients out of the dispensing manifold.

According to one embodiment of the beverage dispensing system, the dispensing manifold includes a beverage input, a beverage output, and one or more ingredient valves coupled to one or more ingredient inputs, wherein the one or more ingredient valves are configured to selectively allow each ingredient of the one or more ingredient inputs to enter an interior of the dispensing manifold upon operation of the corresponding ingredient pump.

According to one embodiment of the beverage dispensing system, the one or more ingredient valves are umbrella valves.

According to one embodiment of the beverage dispensing system, the ingredient pumps are peristaltic pumps.

According to one embodiment of the beverage dispensing system, the beverage dispensing system further includes an output compensator that is fluidly coupled to the dispensing manifold, wherein the output compensator is configured to restrict flow of a beverage based on a pressure of the beverage at the output compensator.

According to one embodiment of the beverage dispensing system, the beverage dispensing system further includes a shell configured to house the ingredient pumps, wherein the shell further includes one or more slots configured to removeably receive and support one or more cartridges containing the ingredients, wherein the one or more cartridges are the ingredient sources that correspond to the one or more ingredient pumps.

According to one embodiment of the beverage dispensing system, the one or more slots are arranged in-line such that the one or more cartridges are arranged parallel to one another within the shell.

According to one embodiment of the beverage dispensing system, the one or more ingredient pumps, the dispensing manifold, and the controller are all contained within a housing.

According to one embodiment of the beverage dispensing system, the beverage dispensing system further includes a refill port and the controller is further configured to, based on receiving a refill command, operate the one or more ingredient pumps in reverse to pump an ingredient from the refill port to one or more of the ingredient sources.

According to aspects of the disclosure, a method of dispensing a beverage includes receiving a recipe from a user, wherein the recipe indicates an amount of each ingredient from one or more ingredient sources; operating the one or more ingredient pumps to inject one or more of the ingredients into a dispensing manifold according to the recipe; opening a dispensing valve to allow a volume of beverage from a beverage source to flow through the dispensing valve and into the dispensing manifold, allowing the volume of beverage to mix with the ingredients in the dispensing manifold; and closing the dispensing valve based on a period of time or a detected volume of beverage.

According to one embodiment of the method, the method further includes verifying the recipe after receiving the recipe from the user by comparing an amount of one or more of the ingredients to a predetermined value or a predetermined range.

According to one embodiment of the method, the method further includes analyzing the recipe after receiving the recipe from the user, to calculate a price associated with the recipe, and charging the calculated price to an account associated with the user or requesting payment from the user prior to operating the one or more ingredient pumps.

According to one embodiment of the method, the recipe is received from an electronic device associated with the user, or by a user interface.

According to one embodiment of the method, at least one of the ingredients contains alcohol, and the method further includes selecting an amount of one or more of the ingredients based on a ratio of the one or more ingredients to the volume of beverage.

According to one embodiment of the method, at least one of the ingredients contains a cannabinoid, and the method further includes selecting a fixed amount of the at least one ingredient containing the cannabinoid, regardless of the volume of beverage.

According to aspects of the disclosure, a beverage dispensing system includes a housing, a dispensing valve configured to be fluidly coupled to at least one beverage source, one or more ingredient pumps configured to be fluidly coupled to one or more ingredient sources, wherein each of the one or more ingredient pumps is mounted within the housing, and is configured to pump a corresponding ingredient from a corresponding ingredient source, a dispensing manifold fluidly coupled to the one or more ingredient pumps, an output compensator fluidly coupled to the dispensing manifold, a dispensing nozzle, and a controller. The controller is configured to receive a recipe from a user, wherein the recipe indicates an amount of each ingredient of the one or more ingredient sources; operate the one or more ingredient pumps to inject one or more of the ingredients into the dispensing manifold according to the recipe; and open the dispensing valve to allow a volume of beverage from the beverage source to flow through the dispensing manifold, wherein the volume of beverage mixes with the one or more ingredients in the manifold and flushes the ingredients out of the dispensing manifold, through the output compensator, and out of the dispensing nozzle.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 98 is a rear perspective view of an exemplary beverage dispensing unit;

DETAILED DESCRIPTION OF THE INVENTION

Embodiments of the invention relate to a beverage dispensing unit. An embodiment of the beverage dispensing unit includes one or more ingredient pumps configured to be fluidly coupled to one or more ingredient sources. The beverage dispensing unit can also be fluidly coupled with a beverage source such as a pressurized container that can contain a beverage such as a seltzer, beer, water, liquor, among others. A user can interact with the beverage dispensing unit to input via a user interface, or upload via a user device, a recipe for a beverage. For example, the recipe can include an amount of one or more of the ingredients within the ingredient sources. The beverage dispensing unit can further include a controller that is configured to operate the one or more ingredient pumps to inject one or more of the ingredients into a dispensing manifold according to the recipe. The controller can be further configured to open a dispensing valve to allow a volume of beverage from the beverage source to flow through the dispensing manifold. The volume of beverage mixes with the one or more ingredients in the dispensing manifold and flushes the ingredients out of the manifold. A first portion of the volume that is mixed with the ingredients flows through an output compensator, and out of the dispensing nozzle. A second portion of the volume remains behind the output compensator in preparation for a subsequent dispensing operation.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

Figure 1:
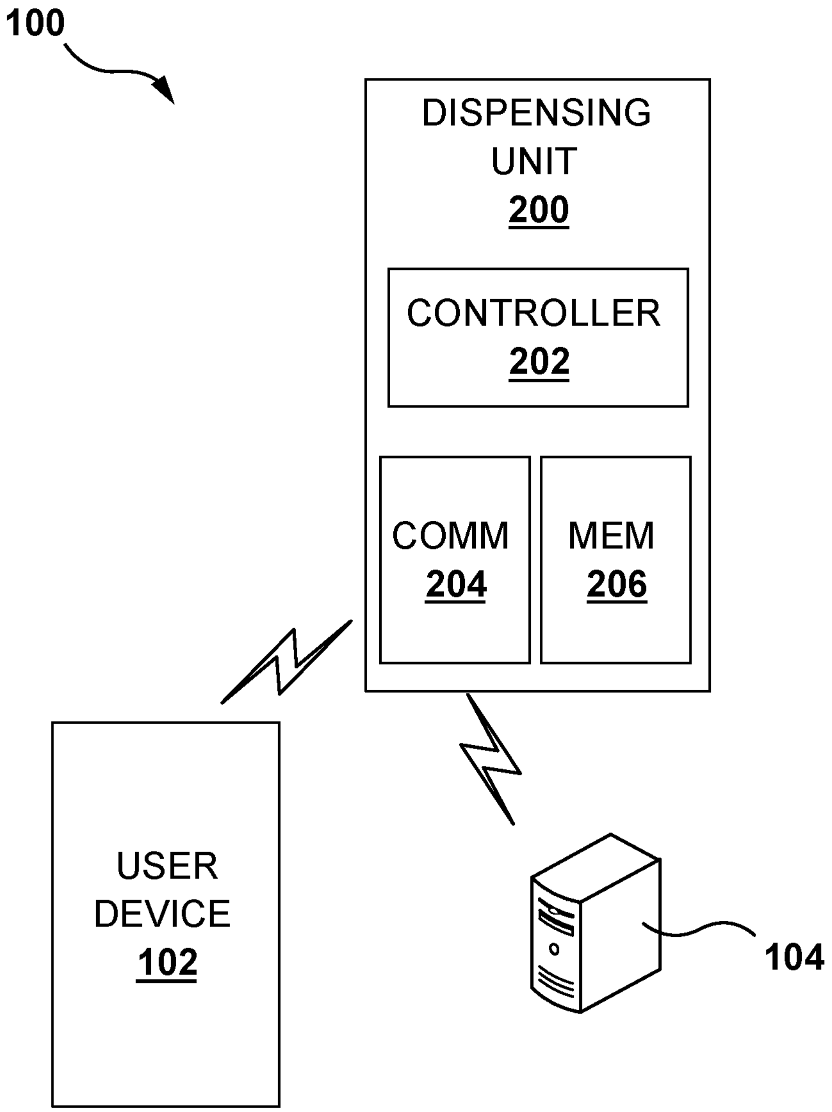
FIG. 1 is a schematic view of an exemplary beverage dispensing system.

Referring now to the drawings, wherein the drawings are for the purpose of illustrating an exemplary embodiment of the beverage dispensing system only and not for the purpose of limiting same, FIG. 1 illustrates an example of a schematic embodiment of beverage dispensing system 100. The beverage dispensing system 100 can include a beverage dispensing unit 200. The beverage dispensing unit can include a controller 202, a communication interface 204, and a memory 206. It should be appreciated that the beverage dispensing unit 200 can include additional electronic components such as one or more power supplies for supplying power to, for example, the controller 202, communication interface 204, and the other components described below (e.g. pumps, valves, etc.). In certain embodiments, the one or more power supplies can be configured to receive 120 volt, 60 Hz input power. However, the one or more power supplies can be selected using sound engineering judgment, taking into account the available power sources.

The controller 202 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. The controller 202 may be a microprocessor, but in the alternative, the controller 202 may be any processor, controller, microcontroller, or state machine. The controller 202 may also be implemented as a combination of computing devices, for example a combination of a DSP and a microprocessor, a plurality of microprocessors, multi-core processors, one or more microprocessors in conjunction with a DSP core, or any other such configuration.

The beverage dispensing system 100 can further include a memory 206. The memory 206 can include volatile and nonvolatile, removable and non-removable media implemented in any method or technology for storage of information such as computer-readable instructions, data structures, program modules, or other data. The memory 116 may include, but is not limited to memory devices (e.g., random access memory (RAM), read-only memory (ROM), electrically erasable programmable read-only memory (EEPROM)), magnetic storage devices (e.g., hard disk, floppy disk, cassettes, tape), optical disks (e.g., compact disk (CD), digital versatile disk (DVD)), and solid state devices (e.g., solid state drive (SSD), flash memory drive (e.g., card, stick, key drive)), or any other medium which can be used to store the desired information and which can be accessed by the controller 202.

The beverage dispensing system 100 can further include a communication interface 204. The communication interface 204 can enable electronic communications between the beverage dispensing unit 200 and another device such as a user device 102 or one or more servers 104 accessible via the internet. It is to be appreciated that the communication interface 204 can be a wired or wireless interface including, but not limited to, a LAN cable interface, an Ethernet cable interface, a USB interface, a serial interface, a WiFi interface, a short-range RF interface (e.g. Bluetooth), an infrared interface, a near-field communication (NFC) interface, etc.

Figure 2:
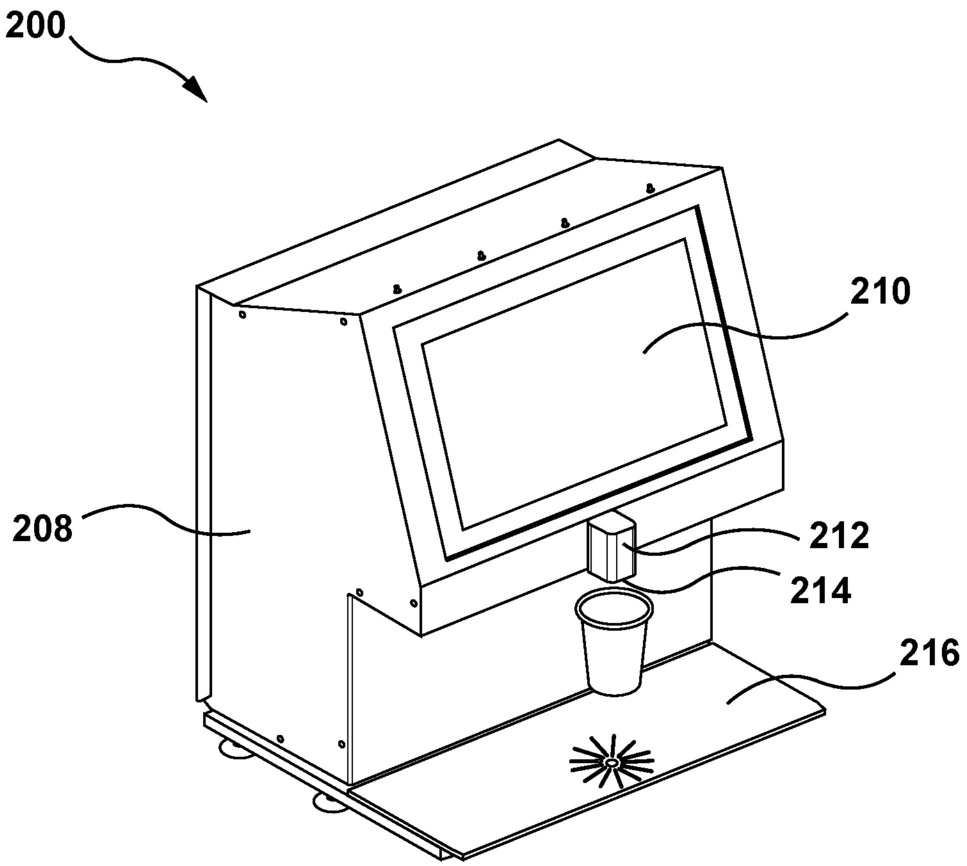
FIG. 2 is a perspective view of an exemplary beverage dispensing unit.

FIG. 2 illustrates an exemplary beverage dispensing unit 200. The beverage dispensing unit 200 can include a housing 208 that encloses internal components of the beverage dispensing unit 200. The housing 208 can be constructed of any suitable material such as a metal, wood, or plastic. In one embodiment, the housing 208 is constructed of stainless steel. The dispensing unit 200 can further include a user interface 210. The user interface 210 can be built-in to the housing 208 and provides a way for a user to interact with the beverage dispensing unit 200 to create custom recipes, browse available ingredients, provide payment, and/or dispense a beverage as describe in greater detail below. The user interface 210 can be, for example, a touchscreen, a number pad, a series of buttons, an LCD screen, among others. The beverage dispensing unit 200 can further include an output compensator 212 that can provide a back pressure on a volume of beverage within the beverage dispensing unit 200 prior to and/or during a dispensing cycle. When the beverage dispensing unit 200 operates a dispensing cycle, the beverage flows through the output compensator 212 and a dispensing nozzle 214 into a cup or other vessel. The beverage dispensing unit 200 can also include a drip tray 216 that can support a cup and also catch any beverage that drips from the dispensing nozzle 214 or otherwise does not get captured by a cup or vessel.

Figure 3:
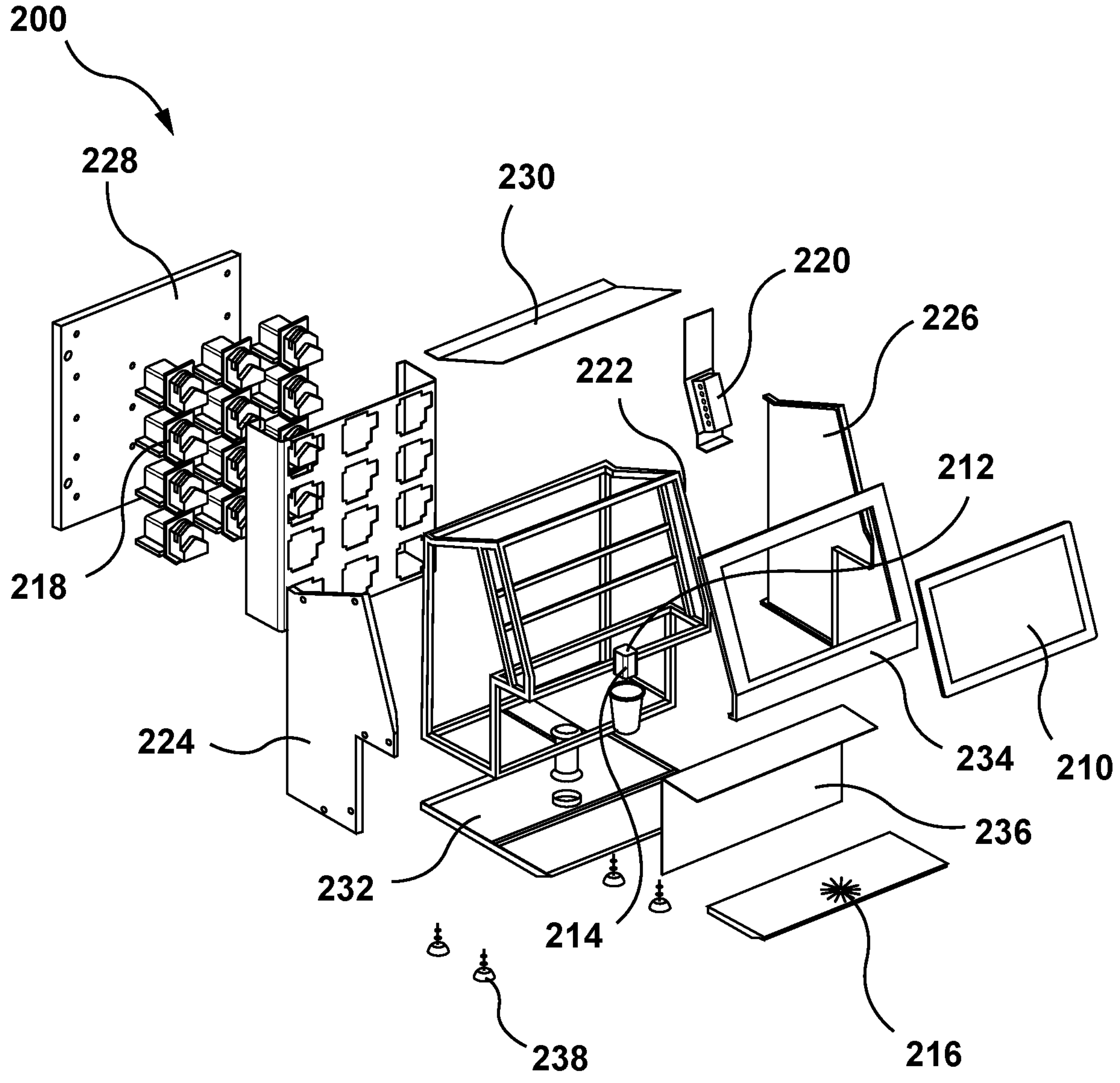
FIG. 3 is an exploded view of an exemplary beverage dispensing unit.

FIG. 3 illustrates an exploded view of an exemplary beverage dispensing unit 200, depicting both internal and external components. In addition to the components described with reference to FIG. 2, the beverage dispensing unit 200 can also include ingredient pumps 218 and a dispensing manifold 220. In one embodiment, the ingredient pumps 218 are peristaltic pumps. The ingredient pumps 218 can be arranged and mounted on an inside surface of a panel within the housing 208. In certain embodiments, the ingredient pumps 218 are arranged in an array. The ingredient pumps 218 can be configured to pump ingredients from ingredient sources into the dispensing manifold 220 based on a recipe. During a dispensing cycle, a volume of beverage flows through the dispensing manifold 220 to mix with and wash away the ingredients in the dispensing manifold 220 prior to flowing out of the dispensing unit through the output compensator 212 and the dispensing nozzle 214.

The beverage dispensing unit 200 can also include a frame 222 to provide structural support. The housing 208, which can include one or more separate panels, can be mounted to the frame 222. In one embodiment, the housing 208 includes a first side panel 224, a second side panel 226, a rear panel 228, a top panel 230, a bottom panel 232, a user interface panel 234, and a front panel 236. In one embodiment, the ingredient pumps 218 are mounted to an inside surface of the rear panel 228. The beverage dispensing unit 200 can further include one or more vibration dampeners 238 mounted to the bottom panel 232. The vibration dampeners 238 can be adjustable feet used to support the beverage dispensing unit 200 and provide leveling capabilities.

Figure 4:
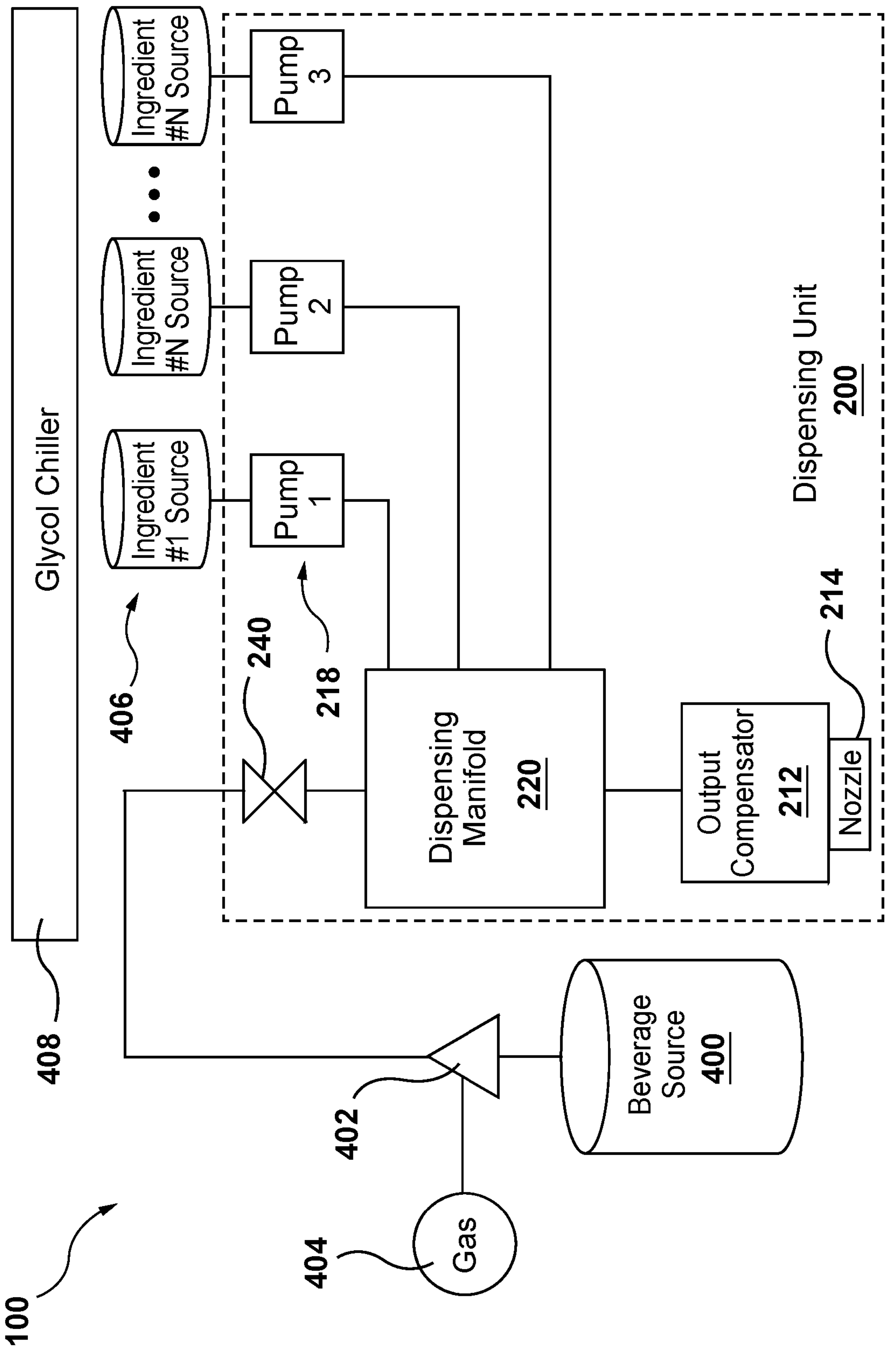
FIG. 4 is a schematic view of an exemplary beverage dispensing system.

Turning now to FIG. 4, a schematic representation of an exemplary beverage dispensing system 100 is shown. The beverage dispensing unit 200 can further include a dispensing valve 240. In certain embodiments, the dispensing valve 240 can be a solenoid valve. The dispensing valve 240 can be configured to be coupled to at least one beverage source 400 such as a keg, barrel, cylinder, or any other appropriate container. The dispensing valve 240 can be coupled to the beverage source 400 by way of tubing and/or piping, which can connect to the beverage source 400 via a coupler 402. The beverage source 400 can also be coupled to a pressurized gas source 404 such as a carbon dioxide ($CO_2$) source, via the coupler 402. In one embodiment, the pressurized gas source 404 can be, for example, $CO_2$ stored at a pressure between 10 psi and 30 psi. In certain embodiments, tubing and/or piping can make the connection between the pressurized gas source 404 and the coupler 402. The pressurized gas source maintains a carbonation level of a beverage contained in the beverage source 400 and can also provide pressure to create a flow and dispense a beverage from the beverage source 400 and through the beverage dispensing unit 200. The beverage source can contain any beverage including, but not limited to, water, seltzer, alcoholic seltzer, beer, liquor, soda, cider, alcoholic cider, other soft drinks such as iced tea, juice, coconut water, or lemonade, among others.

The beverage dispensing system 100 can also include one or more ingredient sources 406. The one or more ingredient sources 406 can be, for example, containers full of ingredients such as flavorings (e.g. cherry, lime, grapefruit, pineapple, etc.), liquor (e.g. gin, vodka, rum, whiskey, tequila, etc.), a cannabinoid (e.g. CBD, THC, CBG, CBN, CBC, THC-V, THC-A, Delta-8, Delta-9, Delta-10, etc.), beer, nootropics, adaptigens, nutrients, electrolytes, vitamin blends, among others. The ingredients can be in a liquid form. The ingredient pumps 218 can be configured to be fluidly coupled to the one or more ingredient sources 406. It should be appreciated that the ingredient pumps can include anywhere from 1 to N individual ingredient pumps, where N is a positive integer. Each individual ingredient pump 218 is fluidly coupled to a corresponding ingredient source 406. Each of the ingredient pumps 218 can be configured to pump a corresponding ingredient from the corresponding ingredient source 406 into the dispensing manifold 220. The ingredient pumps 218 can be fluidly coupled to the ingredient sources 406 and the dispensing manifold 220 by way of tubing and/or piping. In one embodiment, the ingredient pumps 218 are fluidly coupled to the ingredient sources 406 and the dispensing manifold 220 using 1⁄16 inch inner diameter (ID) tubing. In another embodiment, the ingredient pumps 218 are fluidly coupled to the ingredient sources 406 and the dispensing manifold 220 using ⅛ inch inner diameter (ID) tubing.

The dispensing manifold 220 is fluidly coupled to the dispensing valve 240 and the plurality of ingredient pumps 220 by way of tubing and/or piping. Downstream of the dispensing manifold 220 is the output compensator 212, which is fluidly coupled to the dispensing manifold 220 via tubing and/or piping. The output compensator 212 is a device that can restrict flow of the beverage through the beverage dispensing unit 200 depending on the pressure of the beverage backed up against the output compensator 212. In one embodiment, the output compensator 212 is a spring-loaded valve that provides back pressure until a pre-set pressure is overcome. In one embodiment, the output compensator 212 is a pressure compensator configured to stop flow if the pressure on the output compensator 212 is below a pre-set maximum pressure (e.g. a "firing" pressure). For example, when the pressure of the beverage exerted on the output compensator 212 is below a pressure threshold, the output compensator 212 completely restricts the flow of the beverage through the beverage dispensing unit 200. However, when the pressure of the beverage exerted on the output compensator 212 is above the pressure threshold (e.g. the pressure exerted by the beverage during a dispensing cycle), the beverage flows through the output compensator 212 and out of the dispensing nozzle 214. In certain embodiments, even when the beverage flows through the output compensator 212, the output compensator 212 can limit the flow of the beverage.

Figure 9A:
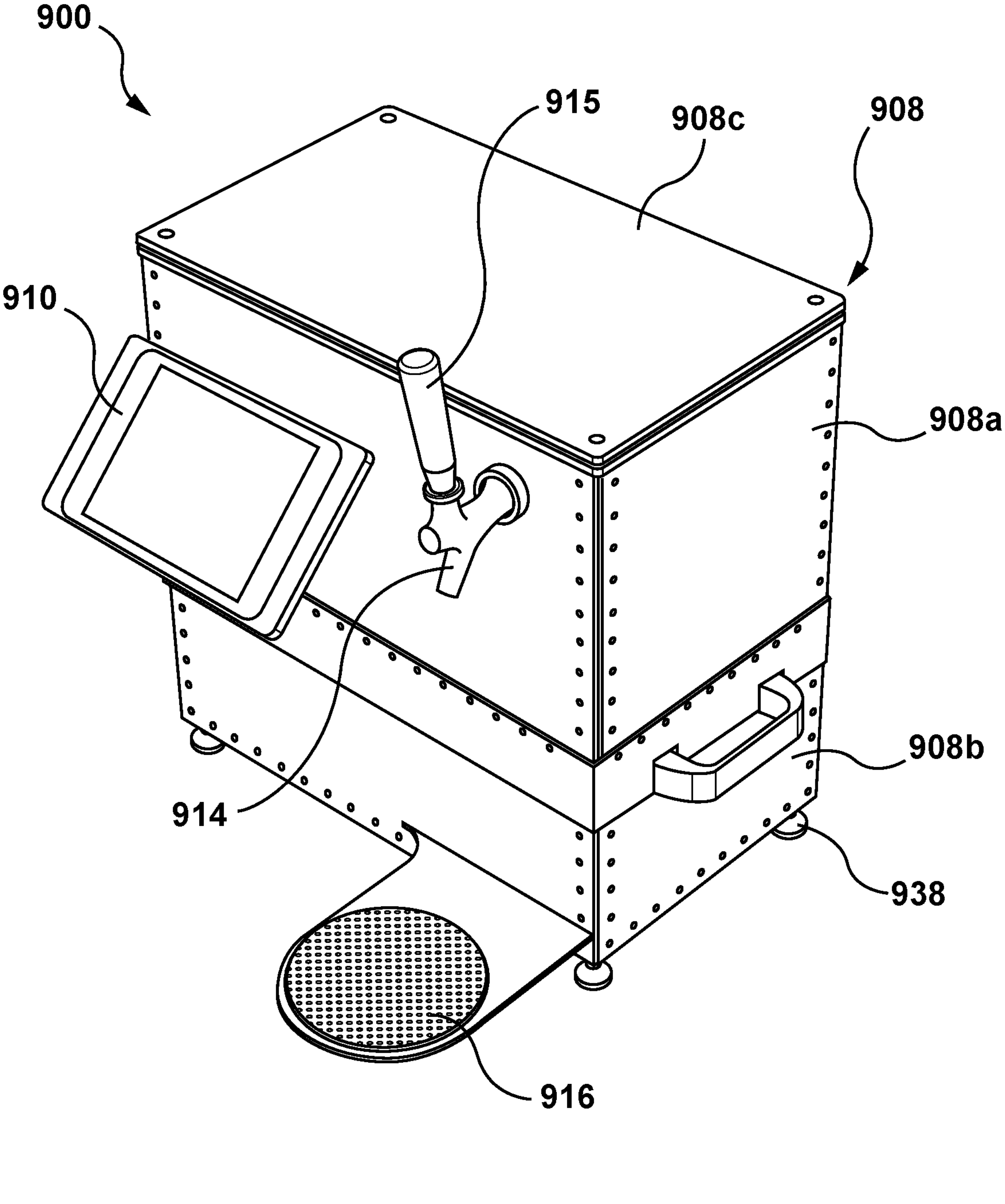
FIG. 9A is a perspective view of another exemplary beverage dispensing unit.

In certain embodiments, dispensing nozzle 214 is a faucet with a tap handle, which together are referred to herein as a tap (e.g. see faucet 914 and tap handle 915 in FIG. 9A). However, it should be appreciated that the term tap as used herein can refer to any type of manually actuated valve (e.g. beer tap, faucet, spout, etc.) The tap can allow a user to start and stop the flow of the beverage manually. Accordingly, in embodiments that include a tap, the dispensing valve 240, and optionally, the output compensator 212, can be eliminated. In such embodiments, a user can manually start and stop the flow of the beverage. For example, after all ingredients are injected into the dispensing manifold 220 based upon a recipe, the user interface 210 can prompt the user to operate the tap to start the flow of the beverage. In still further embodiments, the beverage dispensing unit 200 can include both a tap and a dispensing valve 240. In these embodiments, the flow of beverage can only occur when both the dispensing valve 240 is operated by the controller 202 and a user manually actuates the tap. For example, after all ingredients are injected into the dispensing manifold 220 based upon a recipe, the controller 202 can open the dispensing valve 240 and optionally prompt, via the user interface 210, the user to operate the tap. However, the beverage will not flow out of the dispensing nozzle 214 until a user actuates the tap. When the user operates the tap, the flow of beverage begins. The controller 202 can stop the flow of beverage by closing the dispensing valve 240 (e.g. after determining that a predetermined volume of beverage has been dispensed).

The beverage dispensing system 100 can further include a glycol chiller 408. The glycol chiller 408 can be configured to chill and/or refrigerate one or more of the ingredient sources 406, the beverage source 400, and/or any of the tubing or piping used to fluidly couple any of the components within the beverage dispensing system 100. It should be appreciated that any of the pressurized gas source 404, the beverage source 400, the coupler 402, the ingredient sources 406, and/or the glycol chiller 408 can be located either inside of the beverage dispensing unit 200 or outside of the beverage dispensing unit 200. In one embodiment, the beverage source 400, the coupler 402, the pressurized gas source 404, and the ingredient sources 406 are located beneath a bar in a bar or restaurant setting while they are coupled to the beverage dispensing unit 200, which can be positioned nearby (e.g. on top of a bar or a table). In these embodiments, the corresponding connections between the beverage source 400 and the one or more ingredient sources 406 to the beverage dispensing unit 200 can be made using fittings located on the housing 208, where the type and location of fittings can be chosen using sound engineering judgment.

It should be appreciated that while the various components of the dispensing system 100 are depicted to be located within a dispensing unit 200, the dispensing system 100 can operate with the various components in other locations. For example, certain embodiments involve the dispensing manifold 220 attached and/or retrofitted to an existing beverage tap. In such embodiments, the ingredient sources 406 and the ingredient pumps 218 can be located in an enclosure (e.g. located beneath a bar) with the various tubing routed, for example, through a beer tower to the dispensing manifold 220 coupled to a tap.

The controller 202 can be configured to receive a recipe from a user. The controller 202 can receive the recipe via the user interface 210, or through wired or wireless communications with a user device 102. The recipe can be a set of instructions that indicate an amount of each ingredient such that the user can customize a beverage using individual controls of a quantity, amount, volume, or concentration of each ingredient. For example, a recipe can indicate a percentage, a volume, or a concentration of one or more of the ingredients. The recipe can also include a desired volume of beverage. In one embodiment, a user can create the recipe using the user interface 218. In this embodiment, the user can individually input a volume, an amount, or a percentage of ingredient, or use visual sliders to select an amount of one or more of the ingredients in the ingredient sources 406. In another embodiment, a user can create a recipe using the user device 102. In this embodiment, the user can similarly individually input a volume, an amount, or a percentage of one or more ingredients, or use visual sliders or knobs to select an amount of one or more of the ingredients in the ingredient sources 406. After creating the recipe on the user device 102, the user can save the recipe on the user device 102 and/or communicate the recipe to the beverage dispensing unit 200 via the communication interface 204.

In certain embodiments, after the controller 202 receives a recipe from the user, the controller 202 can perform a verification of the recipe. The verification can include comparing the ingredient amounts selected in the recipe to predetermined values or predetermined ranges. The controller 202 can either accept the recipe if the ingredient values specified in the recipe fall within the predetermined values or predetermined ranges, or reject the recipe if the ingredient values specified in the recipe fall outside of the predetermined values or predetermined ranges. In one embodiment, the controller 202 can analyze the recipe to determine a predicted alcohol-by-volume (ABV) or cannabinoid percentage of a beverage resulting from the recipe. If the predicted ABV or cannabinoid percentage falls below the predetermined limit, the controller 202 can accept the recipe and allow the user to proceed with dispensing the beverage. If the predicted ABV or cannabinoid percentage exceeds a predetermined limit, the controller 202 can reject the recipe. In another embodiment, a value of one or more ingredients is compared to a predetermined limit. If the value of the one or more ingredient (e.g. volume, concentration, etc.) falls within a predetermined range of values, the controller 202 can accept the recipe and allow the user to proceed with dispensing the beverage. If the value of the one or more ingredients falls outside of the predetermined range of values, the controller 202 can reject the recipe. In this manner, the controller 202 can be configured to reject a recipe based on a set of rules in order to prevent the resulting beverage from, for example, breaking a law or posing a health hazard to a user.

Further, the controller 202 can be configured to calculate a price for a recipe. In one embodiment, the controller 202 can access price information for each ingredient, where the price information can be stored in the memory 206 or in an external storage such as a server 104. The controller 202 can analyze a recipe and determine, based on the price information for each ingredient and the amount of the ingredient specified by the recipe, a price of the resulting beverage. The dispensing unit 200 can then display the price of the resulting beverage to a user and also provide a payment method or payment portal to the user via the user interface 210 or the user device 102. When the user provides payment for the price of the resulting beverage via the user device 102, the user interface 210, or a payment device on the beverage dispensing unit 200 (e.g. bill changer, bill accepter, or credit card reader), the controller 202 can then commence a dispensing cycle of the dispensing unit 200. In certain embodiments, the price can be calculated remotely on the one or more servers 104 and communicated to the user device 102 and/or the dispensing unit 200 for display to the user, where the user can submit payment via the user device 102, the user interface 210, or a payment device on the beverage dispensing unit 200.

The controller 202 can then begin a dispensing cycle by operating the ingredient pumps 218 to individually and independently inject one or more ingredients into the dispensing manifold 220 at amounts, volumes, or concentrations defined by the recipe. In one embodiment, the ingredient pumps 218 are peristaltic pumps controlled by pulses sent from the controller 202. For example, the controller 202 can be configured to send a series of pulses to the ingredient pumps 218 in order to cause rotation of rollers within the ingredient pumps 218, and therefore causing the corresponding ingredient to flow from the ingredient source 406 to the dispensing manifold 220. In one embodiment, the controller 202 can be configured to communicate 534 pulses to an ingredient pump 218 in order to achieve a ⅓ revolution of the ingredient pump 218.

The controller 202 can then send a command or signal to open the dispensing valve 240 to allow a volume of beverage from the beverage source 400 to flow through the dispensing valve 240 and into the dispensing manifold 220. Within the dispensing manifold 220, the volume of beverage mixes with the one or more ingredients that have been pumped by the ingredient pumps 218 from the ingredient sources 406. The volume of beverage flushes the ingredients out of the dispensing manifold 220. After flowing through the dispensing manifold 220, the volume of beverage flows through the output compensator 212 and the output nozzle 214.

The beverage dispensing unit 200 can be configured to operate a dispense cycle such that the dispensed volume (e.g. the volume of beverage that actually exits the beverage dispensing unit 200 through the output compensator 212) is a predefined volume. In one embodiment, the controller 202 is configured to open the dispensing valve 240 for a duration that achieves a 4 ounce dispensed volume. The controller 202 may also take into account the volume of ingredients injected into the dispensing manifold 220 in determining how long to open the dispensing valve 240 to achieve the desired dispensed volume. In certain embodiments, the predefined volume that the controller 202 targets for the dispensed volume is selected as a volume that is sufficient to flush out all ingredients from the dispensing manifold 220 to prevent any ingredients being left behind and contaminating subsequent beverages from subsequent dispense cycles.

After the volume of beverage has flowed through the dispensing manifold 220 and washed away all, or significantly all of the ingredients injected into the dispensing manifold 220, and the desired dispensed volume has been achieved, the controller 202 can be further configured to close the dispensing valve 240 to stop flow of the volume of beverage from the beverage source 400 and complete the dispensing cycle. After the dispensing valve 240 is closed, the pressure of the volume of beverage against the output compensator 212 falls below the pressure threshold of the output compensator 212 and a portion of the volume of beverage remains between the output compensator 212 and the dispensing valve 240. This portion of the volume of beverage remaining between the output compensator 212 and the dispensing valve 240 is referred to herein as a holdup volume. The holdup volume includes a portion of the volume of beverage that is completely or substantially free of any additional ingredients from the ingredient sources 406. The holdup volume remains between the output compensator 212 and the dispensing valve 240 until a subsequent dispensing cycle is performed. When a subsequent dispensing cycle is initiated, the ingredients are injected into the dispensing manifold 220 by the ingredient pumps 218, where the ingredients can mix with the holdup volume prior to being washed out by the subsequent volume of beverage of the next dispensing cycle. For any dispensing cycle, the volume of beverage that enters the beverage dispensing unit 200 is equal to the dispensed volume plus the holdup volume.

Figure 5A:
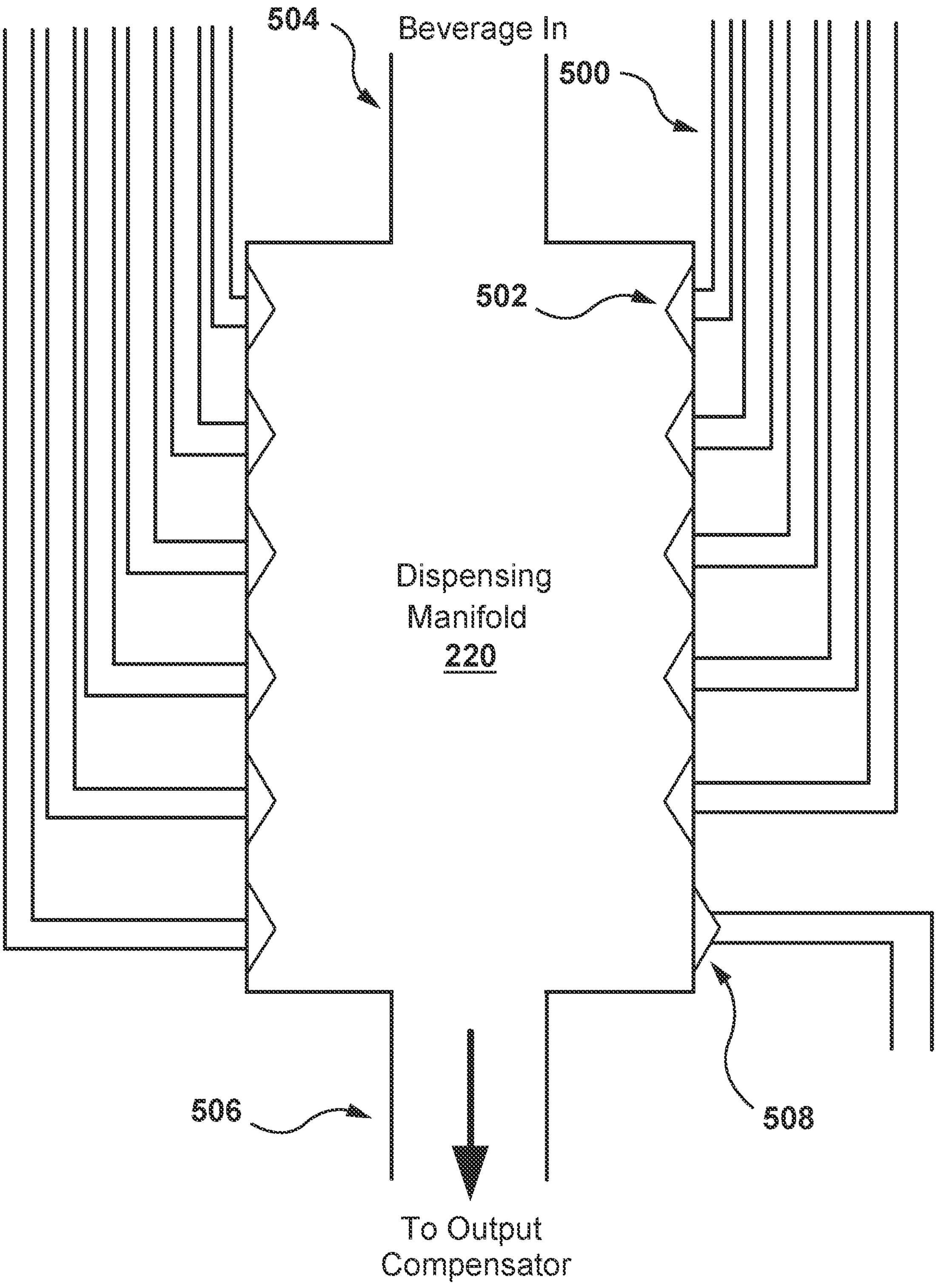
FIG. 5A is a schematic view of an exemplary dispensing manifold.

In certain embodiments, dispensing manifold 220 can include a drain 508 (as shown in FIG. 5A) configured to drain a contents of the dispensing manifold 220. For example, the drain 508 can allow the holdup volume and/or any ingredients to drain from the dispensing manifold 220.

In certain embodiments, the beverage dispensing unit 200 can further include a flow sensor located between the beverage source 400 and the dispensing nozzle 214. The flow sensor can communicate information to the controller 202 regarding the flow of the volume of beverage. The controller 202 can use the flow sensor information to estimate and/or determine a volume of beverage being dispensed. Still further, the beverage dispensing unit 200 can also include a temperature sensor operatively coupled between the beverage source 400 and the dispensing nozzle 214. The temperature sensor can communicate temperature information of the beverage to the controller 202 and/or the glycol chiller 408. The glycol chiller 408 can adjust a temperature of the beverage in response to the temperature information.

FIG. 5A depicts a detailed view of an exemplary dispensing manifold 220. Each ingredient pump 218 includes an ingredient input 500 that can be a tube or pipe that fluidly couples the ingredient pump 218 to the dispensing manifold 220. Each ingredient input 500 connects to an ingredient valve 502 located on the dispensing manifold 220. The ingredient valve 502 is configured to allow the corresponding ingredient to enter the dispensing manifold 220 when the corresponding ingredient pump 218 pumps the ingredient. The pressure of the ingredient flowing through the ingredient input 500 causes the ingredient valve 502 to open, allowing the ingredient to enter the dispensing manifold 220. When the ingredient pump 218 stops pumping the ingredient, the corresponding ingredient valve 502 re-closes to prevent additional ingredient from leaking into the dispensing manifold 220, and to also prevent any of the volume of beverage from entering any of the ingredient inputs 500 while the volume of beverage is flowing through the dispensing manifold 220. In one embodiment, the ingredient valves 502 are umbrella valves. It should be appreciated that the dispensing manifold 220 can include any number of ingredient valves 502 such that there is one ingredient valve 502 corresponding to each ingredient input 500.

The dispensing manifold 220 also includes a beverage input 504 that allows the volume of beverage to flow into the dispensing manifold 220 to mix with the ingredients therein. The dispensing manifold 220 also includes a beverage output 506 that allows the volume of beverage to flow out of the dispensing manifold 220 towards the output compensator 212.

The drain 508 can be configured to drain a contents of the dispensing manifold 220. For example, the drain 508 can be configured to drain the holdup volume and/or any ingredients within the dispensing manifold 220. In one example, after a first dispensing cycle based on a first recipe, a second recipe may be selected by a user. The drain 508 can be configured to open to allow any holdup volume and/or remaining ingredients within the dispensing manifold 220 to drain out of the dispensing manifold to prevent contamination of ingredients from one recipe to the next. The drain 508 can be controlled by the controller 202. In certain embodiments, the drain 508 can be configured to open after every dispensing cycle. In other embodiments, the drain 508 can be configured to open based upon a detected possibility of ingredient contamination from a previous recipe (e.g. an ingredient from a previous recipe is not present in the subsequent recipe). The drain 508 can be connected via a drain tube to sink or any other drain.

Figure 5B:
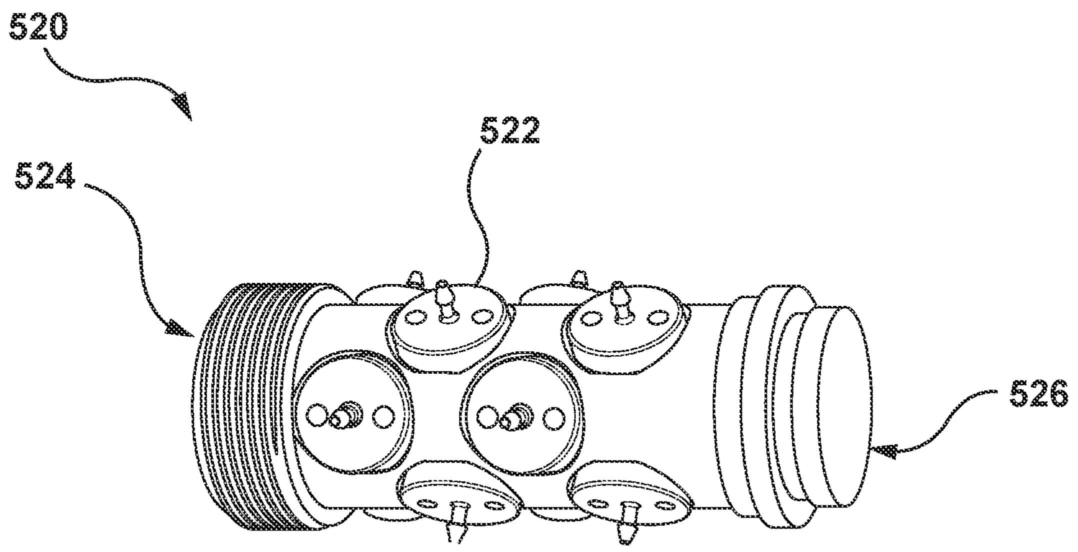
FIG. 5B is a perspective view of an exemplary dispensing manifold.
Figure 5C:
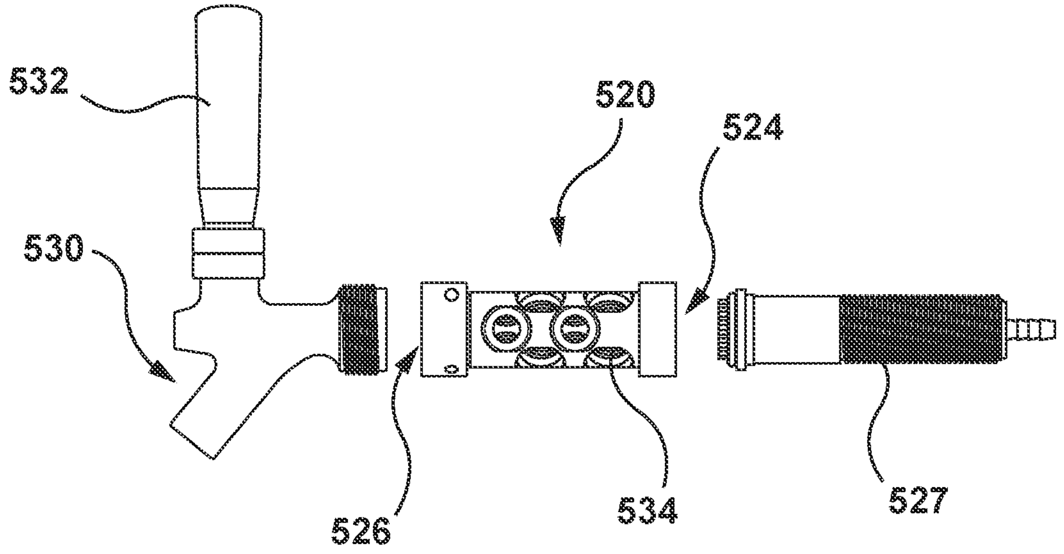
FIG. 5C is an exploded view of an exemplary dispensing manifold arranged with a corresponding faucet and shank.
Figure 5D:
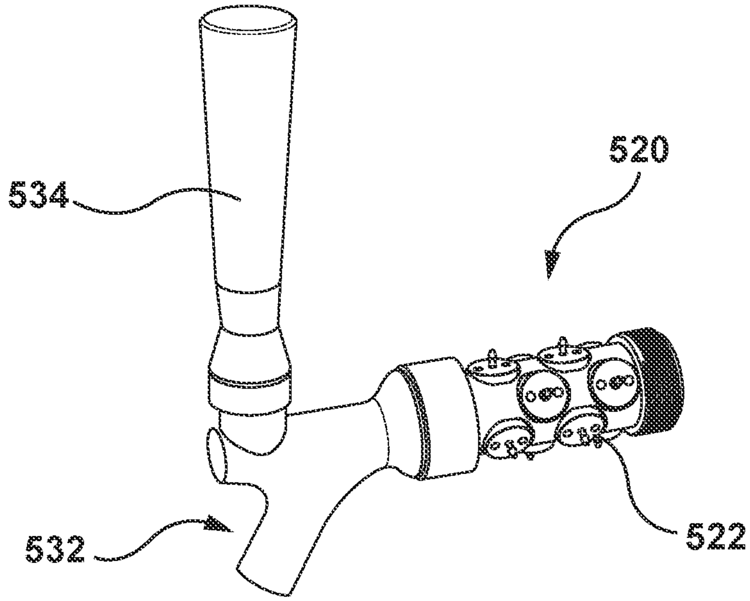
FIG. 5D is a perspective view of an exemplary dispensing manifold coupled with a corresponding faucet.

FIGS. 5B, 5C, and 5D illustrate an embodiment of a dispensing manifold 520. The dispensing manifold 520 can be generally cylindrical in shape. One or more ingredient valves 522 can be arranged on the outer circumference of the dispensing manifold 520. In certain embodiments, the ingredient valves 522 are umbrella valves. As depicted in FIG. 5B, ingredient valves 522 can be arranged in a series of in-line sets of ingredient valves 522 staggered around the outer surface of the dispensing manifold 520. For example, a first set of two or more valve ports 534 and/or ingredient valves 522 can be arranged in-line along a first axis extending in the direction of the length of the dispensing manifold 520. A second set of two or more valve ports 534 and/or ingredient valves 522 can be arranged in-line along a second axis extending in the direction of the length of the dispensing manifold 520, where the second axis is parallel to the first axis. The second set of valve ports 534 and/or ingredient valves 522 can be offset from the first set of valve ports 534 and/or ingredient valves 522 such that the centers of the valve ports 534 and/or ingredient valves 522 of the first set are not circumferentially aligned with the centers of the valve ports 534 and/or ingredient valves 522 of the second set. This pattern can be continued in a manner so that a third set of valve ports 534 and/or ingredient valves 522 are circumferentially aligned with the first set, and a fourth set of valve ports 534 and/or ingredient valves 522 are circumferentially aligned with the second set, etc. It should be appreciated that the dispensing manifold 520 can include any number of ingredient valves 522 from 1 to n, where n is a positive integer. In one embodiment, the dispensing manifold 520 can include eleven ingredient valves 522. In another embodiment, the dispensing manifold 520 can include nine ingredient valves 522.

Dispensing manifold 520 can be incorporated into a beverage dispensing unit 200 that can be positioned on a table, bar, or floor. Alternatively, dispensing manifold 520 can comprise a first end 524 configured to be coupled with a shank 527 and a second end 526 configured to be coupled with a faucet 530. The faucet 530 can further include a tap handle 532. It should be appreciated that the first end 524 and the second end 526 can include any type of connection apparatus necessary to couple each end to the shank 527 or the faucet 530. For example, the first end 524 and the second end 526 can be any of a threaded connection, a connection with a coupling nut, a press and fit connection, a twist and lock connection, among others. In certain embodiments, the dispensing manifold 520 can be configured to be retrofitted to an existing beverage tap that includes the shank 527 and the faucet 530. In embodiments where the dispensing manifold 520 is retrofitted onto an existing shank 527 and/or faucet 530, the other components of the beverage dispensing system 100 or the beverage dispensing unit 200 can be located in a nearby location such as beneath a bar, on a floor, or on a nearby table. For example, the ingredient pumps 218, ingredient sources 406, dispensing valve 240, and/or the controller 202 can be located in an enclosure or shell located proximate to the existing shank 527 and/or faucet 530. Each ingredient source 406 can include an ingredient input 500 such as a tube that fluidly connects the ingredient source 406 to each ingredient valve 522 on the dispensing manifold 520.

As depicted in FIG. 5C, the dispensing manifold 520 can include a plurality of valve ports 534. Each valve port 534 can be configured to receive a corresponding ingredient valve 522 such that the ingredient valves 522 can removeably couple to a valve port 534. In certain embodiments, the valve ports 534 and the ingredient valves 522 have corresponding threaded connections such that an ingredient valve 522 can screw into the valve port 534.

Figure 5E:
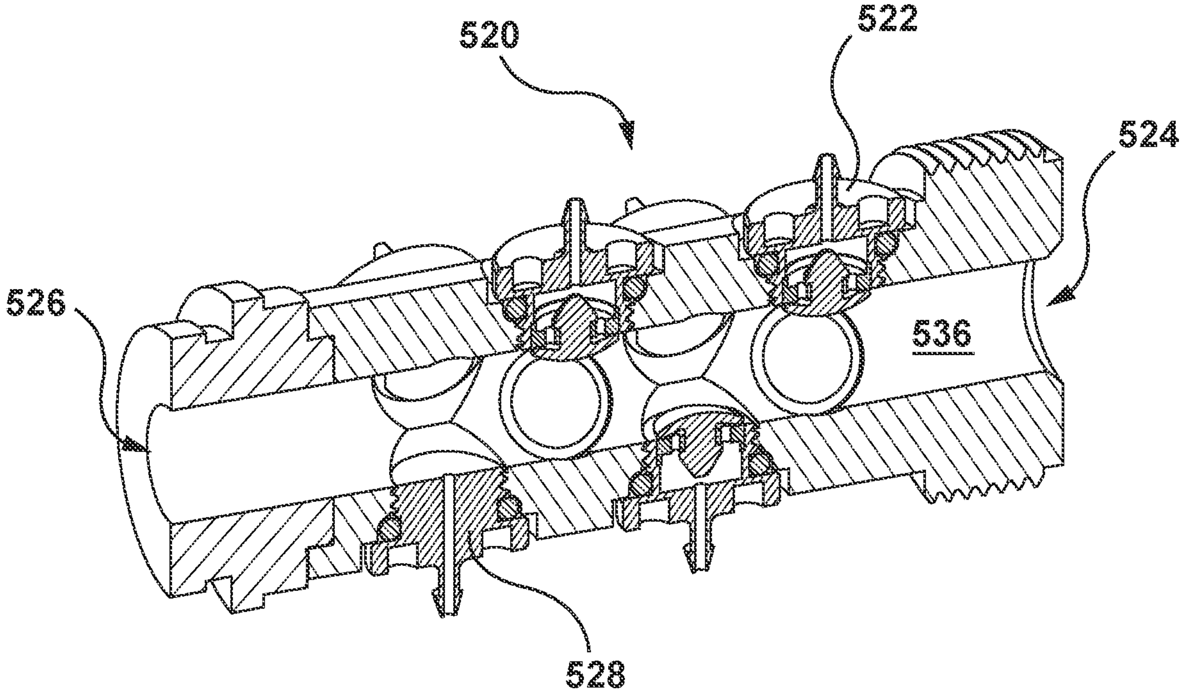
FIG. 5E is a cross-sectional view of an exemplary dispensing manifold.

Turning now to FIG. 5E, a cross-sectional view of the dispensing manifold 520 is shown. A center bore 536 extends through an interior of the dispensing manifold 520, connecting the first end 524 and the second end 526 of the dispensing manifold 520. Each of the ingredient valves 522 provide a selective fluid connection between an interior of the dispensing manifold 520, such as the center bore 536, and the ingredient inputs 500 that can be coupled to the ingredient valves 522. The ingredient valves 522 operate as normally closed valves, and open to allow the contents of the ingredient inputs 500 to flow into the inside of the dispensing manifold 520. In certain embodiments, the dispensing manifold 520 can also include a drain 528 that is configured to selectively drain the contents of the dispensing manifold 520, as described above with respect to FIG. 5A and drain 508.

Figure 5F:
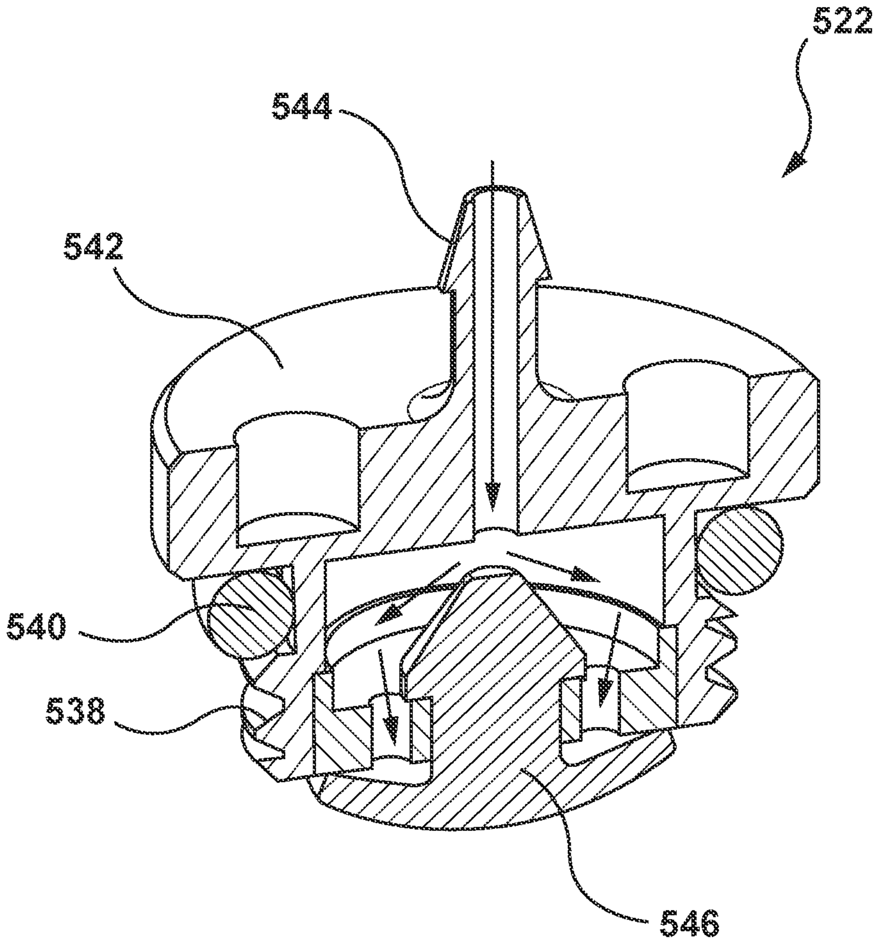
FIG. 5F is a cross-sectional view of an exemplary ingredient valve.

Turning now to FIG. 5F, a cross-sectional view of an ingredient valve 522 is shown. The ingredient valve 522 can have a connecting component 538 such as a threaded surface that allows the ingredient valve 522 to be removably coupled to a valve port 534. An O-ring 540 can be positioned above the connecting component 538 to create a seal between the top component 542 of the ingredient valve 522 and the surface of the dispensing manifold 520. The ingredient valve 522 can further include a barb 544 for receiving an ingredient input 500 such as a tube. The ingredient valve 522 includes a sealing member 546 configured to provide a seal between the ingredient input 500 connected to the barb 544 and the interior of the dispensing manifold 520. As shown by the arrows, when the contents of the ingredient input flows through the ingredient valve and applies a pressure to the flexible portion of the sealing member 546 (e.g. the "umbrella" portion), the flexible portion is flexed, thus providing a fluid path into the interior of the dispensing manifold 520 (e.g. into the center bore 536). For example, when an ingredient pump 218 is operated to pump an ingredient from an ingredient source 406 through an ingredient input 500, the ingredient provides pressure on the flexible portion of the sealing member 546, and the ingredient is injected into the dispensing manifold through the ingredient valve 522.

Figure 6:
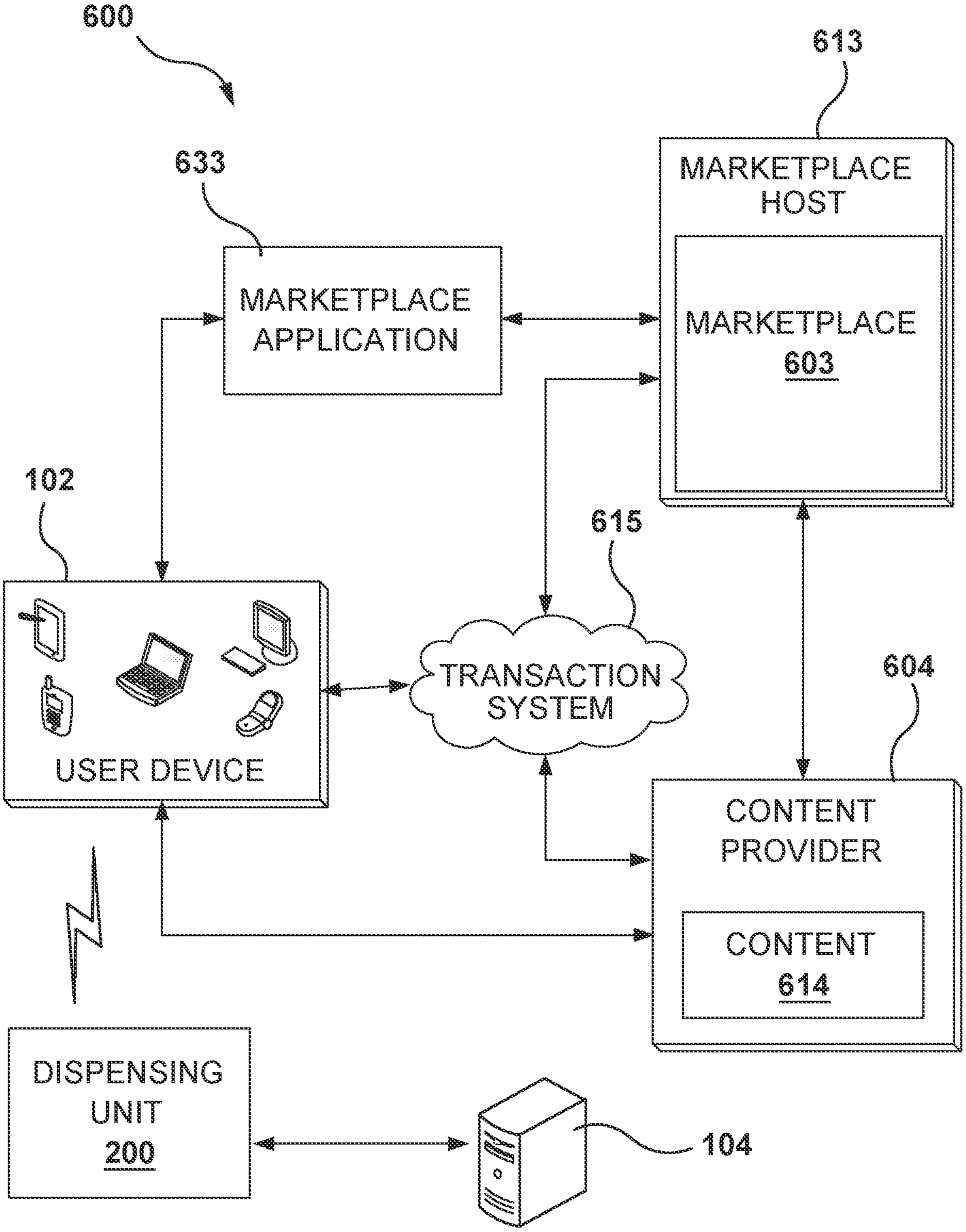
FIG. 6 is a schematic block diagram illustrating a suitable environment for delivery of data in accordance with the subject disclosure.

FIG. 6 illustrates an operating environment 600 that can be used with the subject innovation and in particular, the beverage dispensing system 100, and depicts various options for a user and/or administrator to interact with the beverage dispensing unit 200. The operating environment 600 includes a user device 102 (e.g., a smartphone, a tablet, a laptop, a desktop machine, a portable gaming device, a device with Internet connectivity, among others), a user, a marketplace 603, a content provider 604, and content 614. The operating environment 600 is configured to deliver data (e.g., content 614, which can include sets of instructions corresponding to a companion application to the dispensing unit 200) to the user device 102 based upon a request from the user device 102 (e.g., typically initiated by a user of the user device 102). However, it may be appreciated that the delivery of data to the user device 102 can be pushed to the user device 102 and further approved (e.g. acceptance of license agreement, among others) by the user. The data delivered can be from a content provider 204, wherein the data can be delivered directly to the user device 102 or indirectly delivered to the user device 102 via the marketplace 603 and/or the marketplace applications 633. In certain embodiments, the operating environment 600 can also be configured to collect data from the user device 102. The data collected from the user device 102 can include, for example, recipes, user information such as demographic information, e-mail address, payment information, a user name, a password, order history, recipe history, consumption history, among others. In one example, the data can be collected and stored on the one or more servers 104. In an embodiment, the user device 102 can utilize a transaction system 615 that facilitates purchasing data via at least one of the marketplace 603, the marketplace applications 633, the content provider 604, and the like. The transaction system 615 can be configured to utilize a charging gateway to facilitate completing a transaction between entities (e.g., user, content provider, marketplace, an administrator of the dispensing unit 200, a venue hosting the dispensing unit 200, among others).

By using the companion application, which can be executed using the user device 102, a user can interact with beverage dispensing units 200 using wired or wireless communications. For example, the user can use the companion application on the user device 102 to create a recipe, electronically pay for a beverage (e.g. by entering credit card or other payment account information), and/or instruct the beverage dispensing unit 200 to create a beverage based on a recipe. The companion application on the user device 102 can also allow a user to view the locations and statuses of beverage dispensing units 200, including an inventory of ingredients available at each beverage dispensing unit 200. A user can also create recipes, save recipes, rate recipes, and share recipes with other users of the companion application.

An administrator of a beverage dispensing system 100 can communicate with the beverage dispensing system 100 remotely over a network. In this manner, an administrator can view ingredient inventory in beverage dispensing units 200, view diagnostic information pertaining to the beverage dispensing unit 200, and/or receive notifications or alerts pertaining to the operation or maintenance of the beverage dispensing unit 200.

Figure 7:
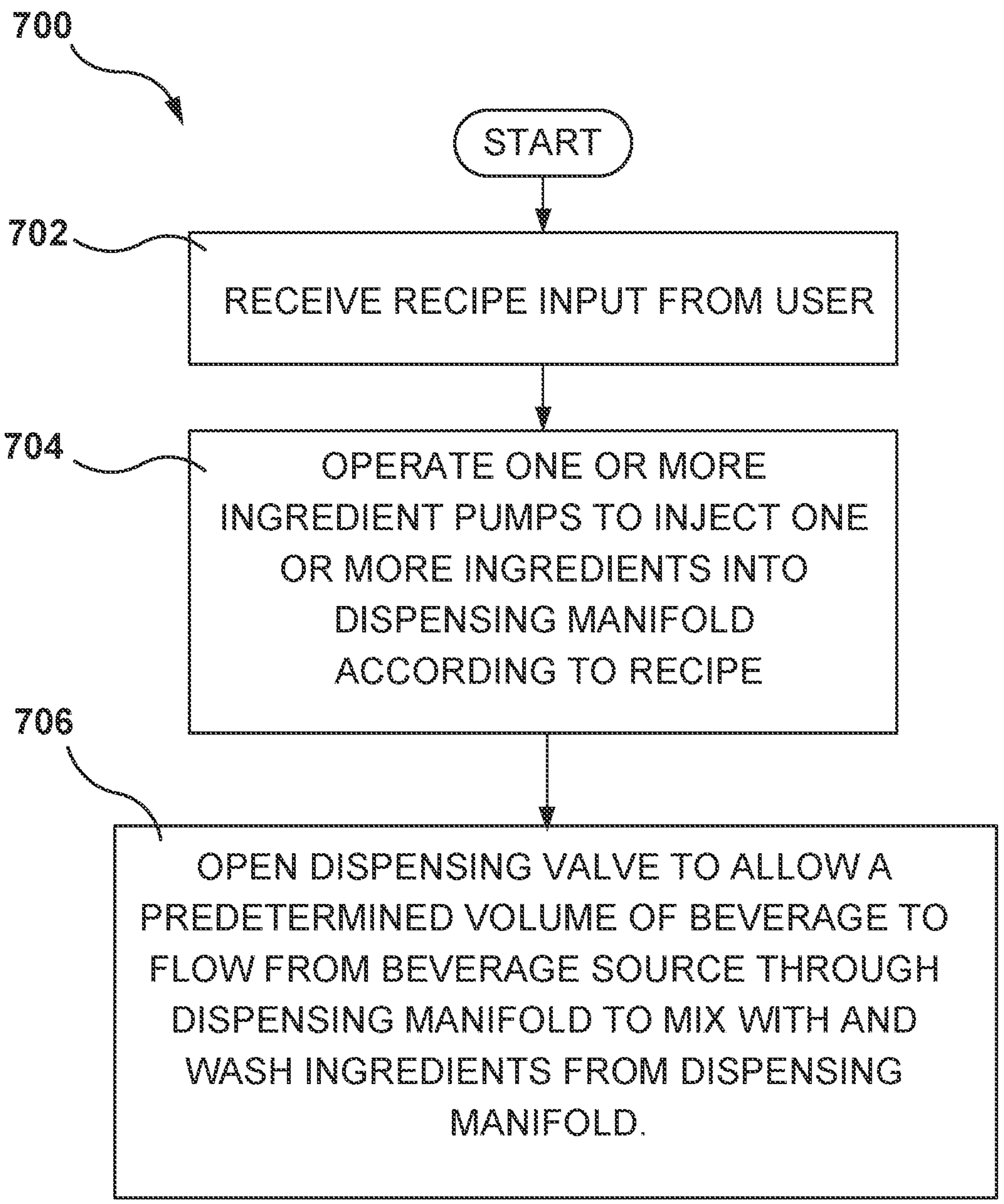
FIG. 7 is a flow diagram depicting the operation of an exemplary beverage dispensing system.

Turning now to FIG. 7, an exemplary method 700 is depicted. At reference numeral 702, the controller 202 receives a recipe input from a user. The recipe can be a set of instructions that includes an amount of one or more ingredients and/or a desired volume of beverage. In certain embodiments, the controller 202 can also receive customer data from the user device 102. The customer data collected from the user device 102 can include, for example, recipes, user information such as demographic information, e-mail address, payment information, a user name, a password, order history, recipe history, consumption history, among others. In one example, at least a portion of the customer data can be retrieved from the one or more servers 104 based on an identification of the user received from the user device 102. In certain embodiments, the controller 202 can proceed with the dispensing cycle according to the recipe based upon a transaction being executed. For example, the user, via the user device 102, can submit a payment calculated according to the recipe. After the user submits payment using the user device 102, the user interface 210, or a payment device on the beverage dispensing unit 200, the controller 202 is configured to proceed with the dispensing cycle according to the recipe. In certain embodiments where a user submits a payment remotely via the user device 102, in which payment is processed by a remote transaction system 615, the controller 202 can receive a command from, for example, the transaction system 615 or the one or more servers 104, indicating that the user's transaction has been processed and to proceed with the dispensing cycle according to the recipe.

In an embodiment, at least one of the ingredients can contain alcohol. In this embodiment, the controller 202 can select an amount of the at least one ingredient containing alcohol based on a ratio of the at least one ingredient to the volume of the beverage. For example, the amount of the alcoholic ingredient can be selected based upon an alcohol by volume calculation or set point. The amount of an alcoholic ingredient dispensed as part of any given recipe can be tracked and viewable remotely over the internet by, for example, an administrator, a third party, a governmental agency, or a regulatory agency.

In another embodiment, at least one of the ingredients can contain a cannabinoid. In this embodiment, the controller 202 can select a fixed amount of the at least one ingredient containing the cannabinoid, regardless of the volume of the beverage. The amount of cannabinoid dispensed as part of any given recipe can be tracked and viewable remotely over the internet by, for example, an administrator, a third party, a governmental agency, or a regulatory agency.

At reference numeral 704, the controller 202 operates one or more ingredient pumps 218 to inject one or more ingredients into the dispensing manifold 220 according to the recipe. It should be appreciated that each of the ingredient pumps 218 can operate simultaneously or sequentially. The ingredient pumps 218 inject each of the corresponding ingredients into the dispensing manifold 220 at a volume that corresponds to the amount indicated for the particular ingredient in the recipe. It should also be appreciated that the dispensing manifold 220 can be built-in to a beverage dispensing unit 200 such as a unit that can sit on a bar or tabletop, or the dispensing manifold 220 can be coupled to an existing tap including a shank 527 and faucet 530 (e.g. retrofitted onto an existing tap). At reference numeral 706, the controller 202 opens the dispensing valve 240 to allow a predetermined volume of beverage to flow from the beverage source 400 through the dispensing manifold 220 to mix with and flush the ingredients from the dispensing manifold 220. The predetermined volume of beverage can be pre-programmed into the controller 220, communicated to the controller 202 by an administrator, or it can be chosen based on the recipe. In certain embodiments that incorporate a tap and/or faucet (e.g. tap handle 532 and faucet 530), a user must also pull the tap handle or otherwise operate the faucet in order to allow the predetermined volume of beverage to flow through the dispensing manifold 220 and out of the faucet. In certain embodiments, a volume of beverage will continue to flow until the user closes the faucet (e.g. by operating the tap handle). In other embodiments, the controller 202 can close the dispensing valve 240 when the predetermined volume of beverage has been dispensed, and the beverage will therefore stop flowing/dispensing even if the faucet is still opened.

Figure 8:
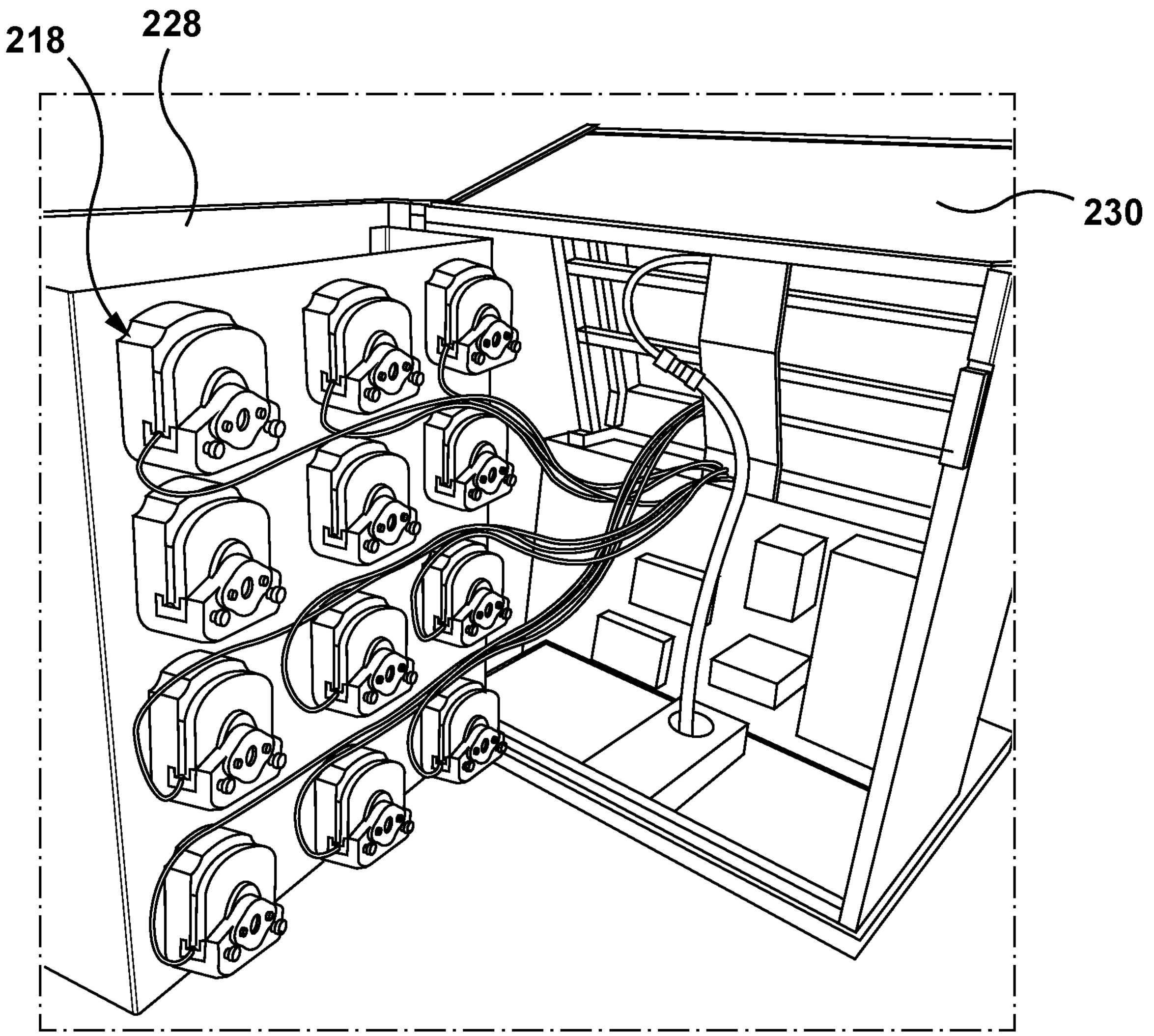
FIG. 8 is a rear view of an exemplary beverage dispensing unit.

Turning now to FIG. 8, in an exemplary embodiment, the ingredient pumps 218 can be arranged on an inside surface of the rear panel 228. The ingredient pumps 218 can be coupled to the dispensing manifold 220 with tubing that is long enough so that the rear panel 228 can be opened for easy access to the ingredient pumps 218 so that one or more of the ingredient pumps 218 can be easily serviced, maintained, repaired, or replaced.

Figure 9B:
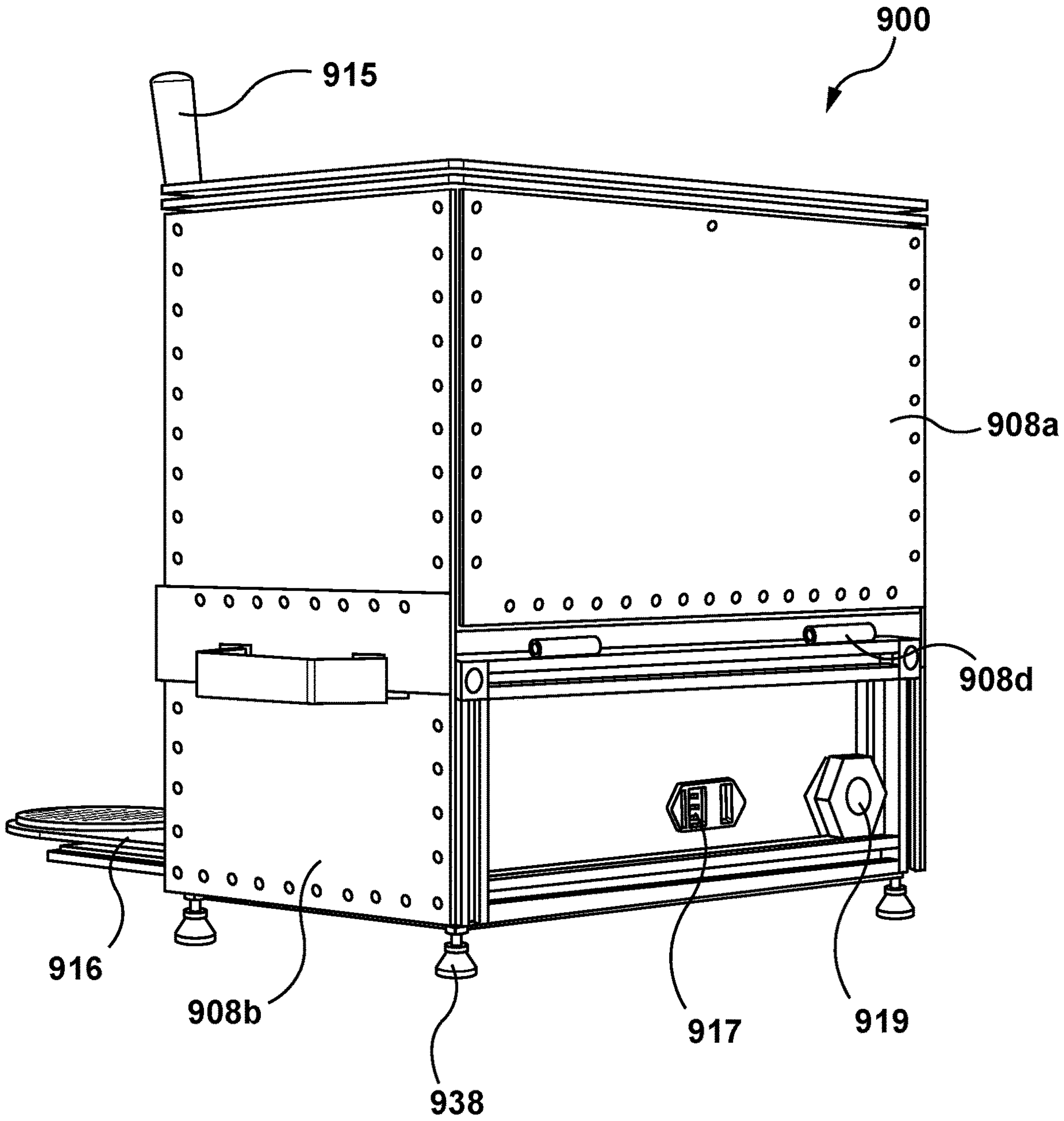
FIG. 9C is an internal view of an exemplary beverage dispensing unit.
FIG. 9D is an internal view of an exemplary beverage dispensing unit.
FIG. 9E is an internal view of an exemplary beverage dispensing unit.

Turning now to FIGS. 9A and 9B, an exemplary embodiment of a beverage dispensing unit 900 is shown. Beverage dispensing unit 900 can include a user interface 910 such as a touchscreen interface. The beverage dispensing unit 900 can also include a housing 908. The housing 908 can be made of any suitable material such as one or more of metal, plastic, or wood. The housing 908 can include a top portion 908*a* and a bottom portion 908*b*. In certain embodiments, the top portion 908*a* is coupled to the bottom portion 908*b* by way of one or more hinges 908*d* that allows the top portion 908*a* to be tilted or rotated backwards to provide a user with access to the internal components of the beverage dispensing unit 900. The top portion 908*a* can include a removable top panel 908*c*. The top panel 908*c* can be removably coupled to the top portion 908*a* using fasteners such as screws, thumb screws, bolts, latches, clamps, among others.

Beverage dispensing unit 900 can further include a tap that includes a faucet 914 and a tap handle 915, and a drip tray 916 configured to support a vessel that is receiving a beverage dispensed from the faucet 914. The beverage dispensing unit 900 can further include vibration dampeners 938 that are adjustable feet that can be used to level the beverage dispensing unit 900 and are also configured to dampen vibrations created by the beverage dispensing unit 900. Beverage dispensing unit 900 can further include one or more handles to allow a user to easily pick up the beverage dispensing unit 900. The beverage dispensing unit 900 can also include a power input 917 (e.g. for connection to a power outlet) and also a beverage input 919 that can accept an input, such as a tube, that provides fluid communication to one or more beverage sources 400.

Figure 9C:
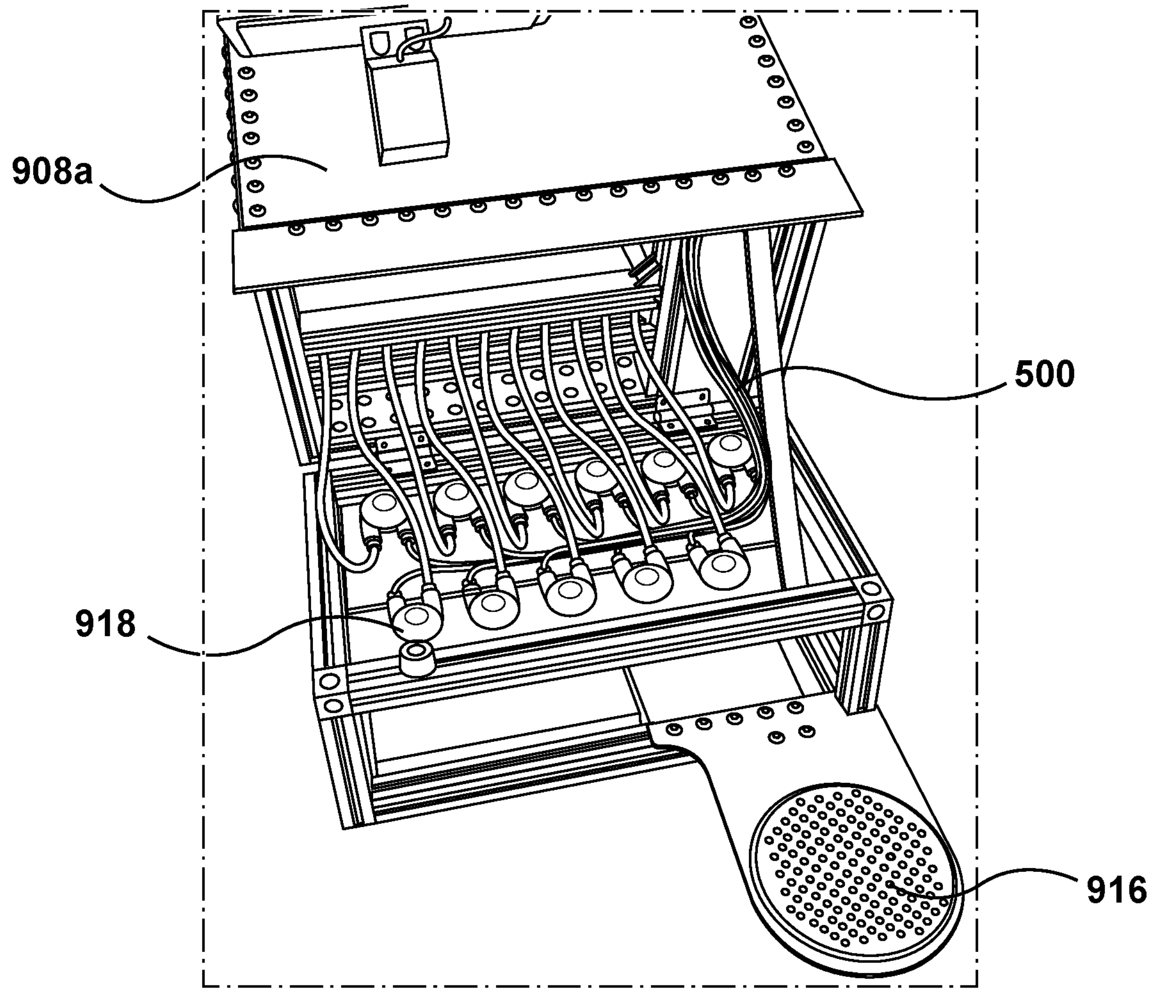

FIG. 9C shows the beverage dispensing unit 900 with the top portion 908*a* tilted backwards via the one or more hinges 908*d*. With the top portion 908*a* tilted backwards, a plurality of ingredient pumps 918 are exposed. The plurality of ingredient pumps 918 can be arranged in one or more rows. Each ingredient pump 918 includes an inlet tube that fluidly couples the ingredient pump 918 with an ingredient source 406. Each ingredient pump 918 also includes an outlet tube that fluidly couples the ingredient pump with a dispensing manifold 220. In other words, the outlet tube is the ingredient input 500 into the dispensing manifold 220. It should be appreciated that there can be any number 1 through n of ingredient sources 406 and/or ingredient valves 522, where n is a positive integer. In one embodiment, the beverage dispensing unit 900 can include eleven pumps 918 fluidly connected to eleven ingredient sources 406 and eleven ingredient valves 522. In another embodiment, the beverage dispensing unit 900 can include nine pumps 918 fluidly connected to nine ingredient sources 406 and nine ingredient valves 522.

Figure 9D:
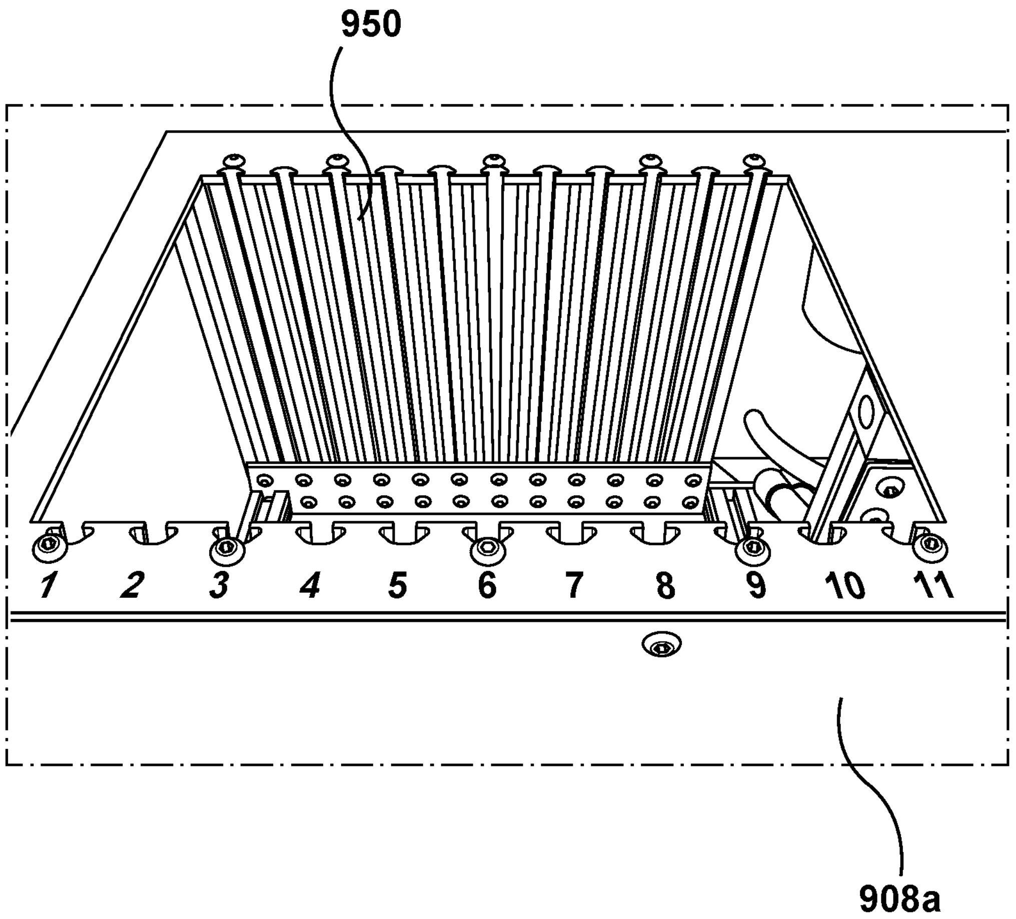
Figure 9E:
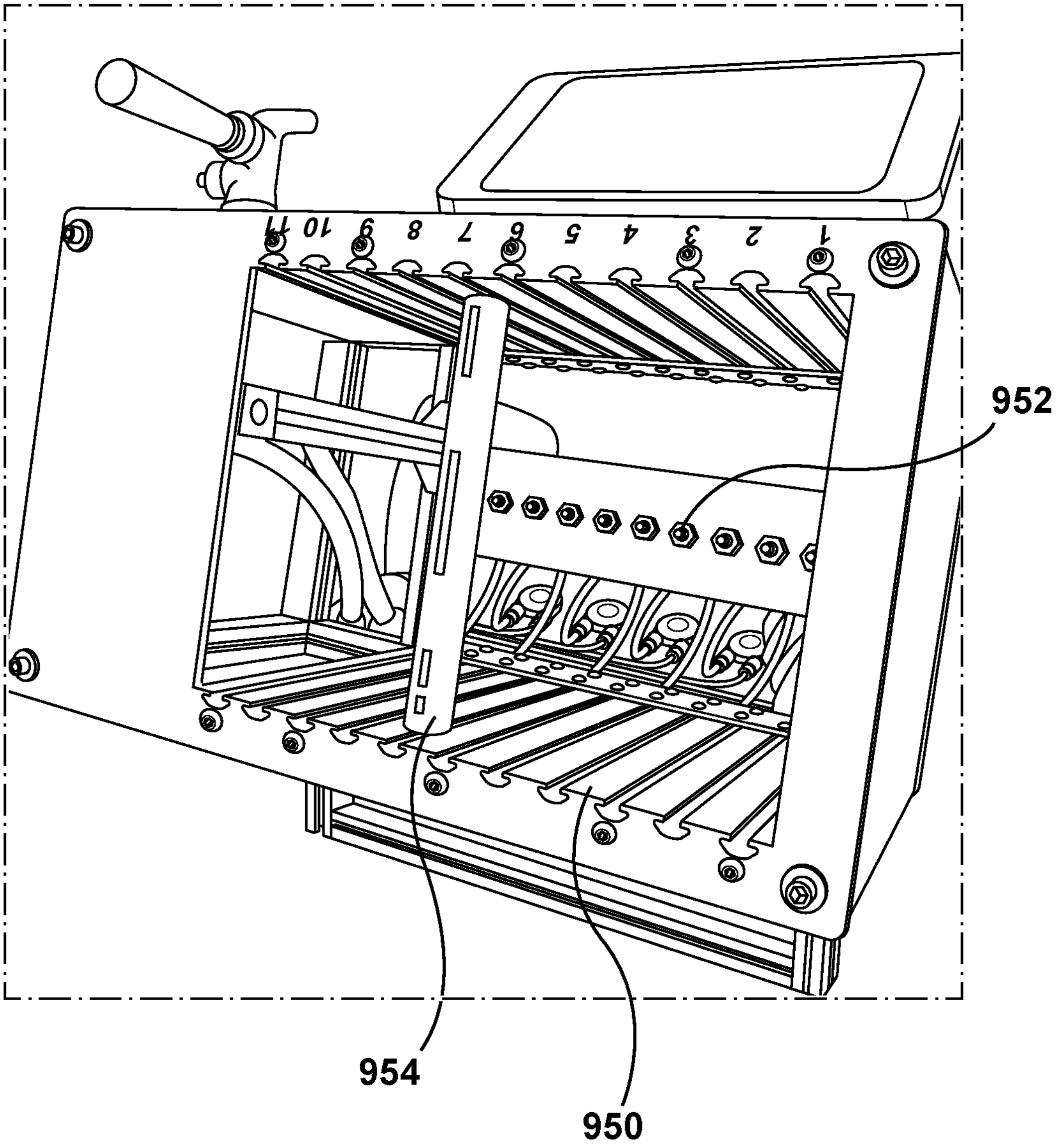

FIGS. 9D and 9E show a view of the top portion 908*a* with the top panel 908*c* removed to expose the area within the top portion 908*a*. Within the top portion 908*a*, the beverage dispensing unit 900 includes one or more slots 950 that are configured to receive ingredient sources 406 such as ingredient cartridges 1000 (shown in FIG. 10). The slots 950 can be arranged next to one another such that the slots 950 can receive ingredient sources, which can be arranged in-line and parallel to one another in a row. It should be appreciated that there can be any number 1 through n of slots 950, where n is a positive integer. In one embodiment, the top portion 908*a* can include eleven slots 950 to house eleven ingredient sources 406 such as ingredient cartridges 1000. In another embodiment, the top portion 908*a* can include nine slots 950 to house nine ingredient sources 406 such as ingredient cartridges 1000.

Each slot 950 can correspond with a cartridge port 952 that is configured to receive a cartridge connector 1006 (shown in FIG. 10) of the cartridge 1000 inserted into the slot 950. The cartridge port 952 receives the cartridge connector 1006 on one end, and is coupled with the inlet tube to the corresponding ingredient pump 918 on the other end. In this manner, the cartridge port 952 acts as an interface between the ingredient source 406 (e.g. the cartridge 1000) and the inlet tube for the ingredient pump 918. A cartridge locking bar 954 can be removably coupled onto a slot 950 over a cartridge 1000. The cartridge locking bar 954 can be configured to keep the cartridge 1000 secure in place. In certain embodiments, the cartridge locking bar 954 can have a locking mechanism such as a key lock to prevent an unauthorized user from removing any ingredient sources 406. An authorized user such as a maintenance or repair technician may have access to the key lock for removal of the ingredient sources 406.

In certain embodiments, a beverage dispensing system 100 can include a shell or enclosure configured to house the ingredient pumps 918 and the one or more slots 950 configured to removeably receive and support one or more cartridges 1000 containing the ingredients.

Figure 10:
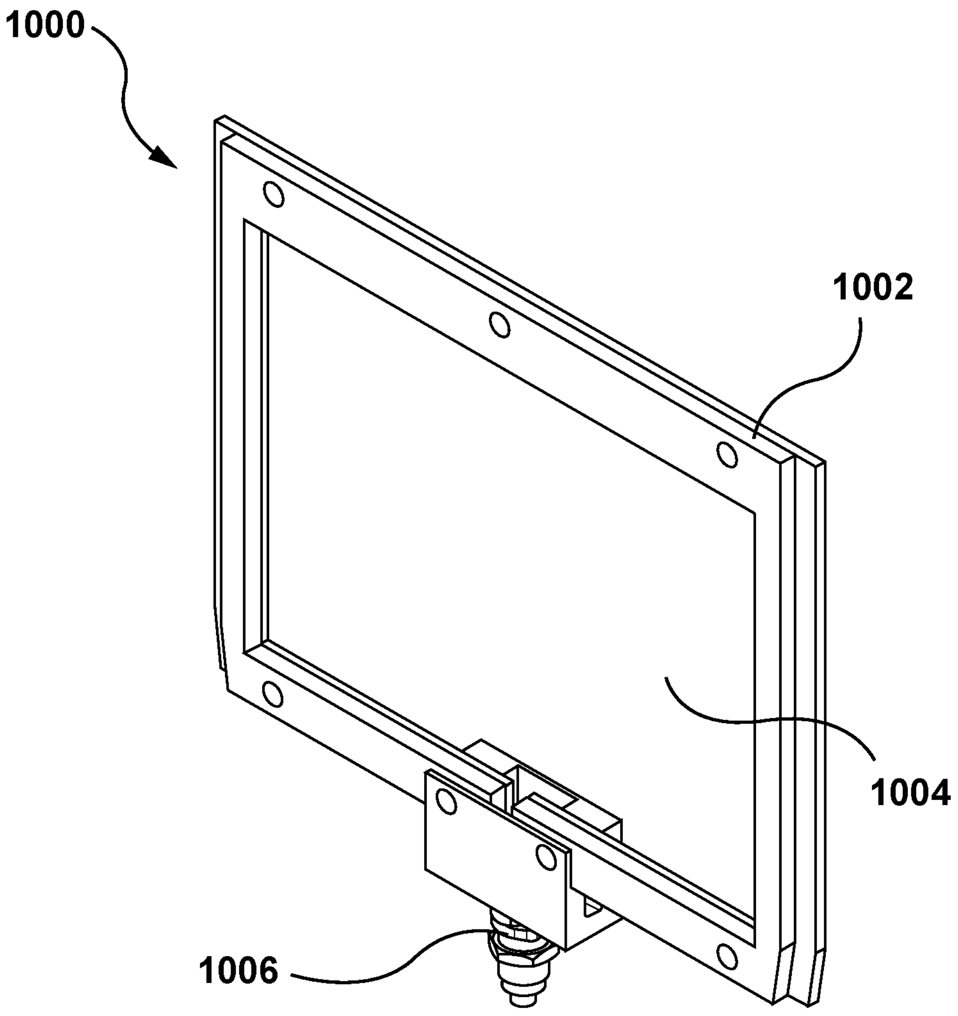
FIG. 10 is a perspective view of an exemplary cartridge frame.

The cartridge 1000 shown in FIG. 10 can be used as an ingredient source 406. The cartridge 1000 can include a frame 1002 that defines an interior space 1004. The frame 1002 can be constructed out of a variety of materials such as metal, plastic, wood, bamboo, or cardboard. The interior space 1004 can be enclosed and sealed using material chosen using sound engineering judgment. For example, the interior space 1004 can be enclosed and sealed using a plastic material. The ingredient can be stored within the interior space 1004. The cartridge 1000 can further include a cartridge connector 1006 fluidly coupled with the interior space 1004. As described with respect to FIG. 9E, the cartridge connector 1006 is configured to removably mate with the cartridge port 952 to provide a fluid interface between the ingredients within the interior space 1004 of the cartridge 1000 and the input tubing to the corresponding ingredient pump 918. For example, a user can slide the cartridge 1000 into a slot 950 until the cartridge connector 1006 mates with the cartridge port 952 that corresponds with the particular slot 950. In certain embodiments, a user can program the controller 202 to indicate the ingredient contents of each cartridge 1000 located in each slot 950. Indicating the position and contents of each cartridge 1000 allows the controller 202 to operate the correct ingredient pumps 918 when performing a dispense cycle according to a recipe.

Figure 11:
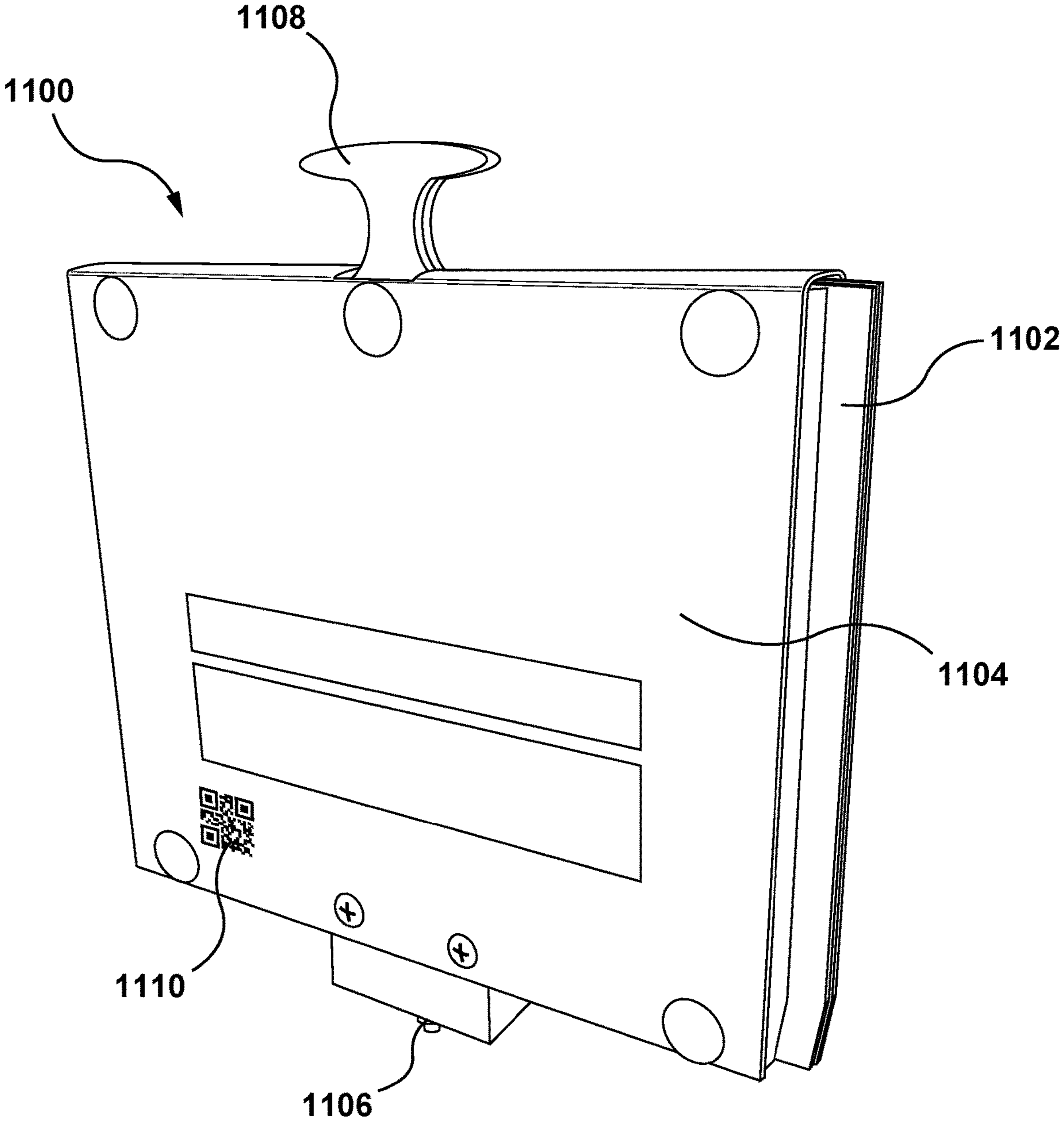
FIG. 11 is a perspective view of another exemplary cartridge frame.

FIG. 11 depicts another embodiment of a cartridge 1100, that similarly includes a frame 1102 defining an interior space 1104, and a cartridge connector 1006 configured to mate with the cartridge port 952. Cartridge 1100 can also include a handle 1108 to provide a mechanism for a user to grasp and hold the cartridge 1100 while inserting or removing the cartridge 1100 from its slot 950.

The cartridge 1100 can include an indicia 1110 such as a radio frequency identification (RFID) chip, a bar code, a serial number, or a QR code. The indicia 1110 can provide an identification to each cartridge 1100 and can allow the controller 202 or a user to authenticate the cartridge 1100 as genuine or from a particular source. For example, the controller 202 or a user can scan or read the indicia to determine whether the cartridge is from a particular manufacturer or from an unauthorized third party. In certain embodiments, the indicia can include an identification of the contents of the ingredients within the cartridge 1100. For example, the controller 202 can operate an indicia scanner to automatically scan the indicia so that the controller is programmed with the contents of the cartridge 1100 and its corresponding slot 950 location.

In one embodiment, the cartridge 1000, 1100 is generally rectangular and has a thickness of one inch or less, and can hold a volume of 300 ml of an ingredient.

In certain embodiments, the cartridges 1000, 1100 can be refillable. In one embodiment, a user, such as a technician, can remove a cartridge 1000, 1100 from a beverage dispensing unit 900 and place it in a refilling apparatus. The refilling apparatus can pump and/or inject ingredient into the cartridge 1000, 1100 from an ingredient reservoir to refill the cartridge. In another embodiment, the cartridge 1000, 1100 can be refilled while remaining in the dispensing unit 900. In this embodiment, the beverage dispensing unit 900 further includes a refill port, and the controller is further configured to, based on receiving a refill command, operate the one or more ingredient pumps 918 in reverse to pump/transfer an ingredient connected to the refill port to one or more of the ingredient sources such as the cartridge 1000, 1100. The user refilling the cartridge can select which cartridge is to be filled (e.g. which of the ingredient pumps 918 to operate in reverse). For example, the user can select the cartridge 1000, 1100 to be refilled by using the user interface 910.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A beverage dispensing system, comprising:

one or more ingredient pumps configured to be fluidly coupled to one or more ingredient sources, wherein each of the one or more ingredient pumps is configured to pump a corresponding ingredient from a corresponding ingredient source;

a dispensing manifold fluidly coupled to the one or more ingredient pumps; and a controller configured to:

receive a recipe from a user, wherein the recipe indicates an amount of each ingredient of the one or more ingredient sources; and operate the one or more ingredient pumps to inject one or more of the ingredients into a first holdup volume in the dispensing manifold according to the recipe.

2. The beverage dispensing system of claim 1, wherein the dispensing manifold comprises a first end configured to be coupled with a shank and a second end configured to be coupled with a faucet.

3. The beverage dispensing system of claim 2, wherein the dispensing manifold is configured to be retrofitted to an existing beverage tap that includes the shank and the faucet.

4. The beverage dispensing system of claim 1, further comprising a dispensing valve configured to be fluidly coupled to at least one beverage source and the dispensing manifold.

5. The beverage dispensing system of claim 4, wherein the controller is further configured to:

open the dispensing valve to allow a volume of beverage from the beverage source to flow through the dispensing manifold, wherein the volume of beverage mixes with the first holdup volume in the dispensing manifold, flushes the ingredients out of the dispensing manifold, and leaves a second hold up volume in the dispensing manifold.

6. The beverage dispensing system of claim 1, wherein the dispensing manifold comprises:

a beverage input;

a beverage output; and one or more ingredient valves coupled to one or more ingredient inputs, wherein the one or more ingredient valves are configured to selectively allow each ingredient of the one or more ingredient inputs to enter an interior of the dispensing manifold upon operation of the corresponding ingredient pump.

7. The beverage dispensing system of claim 6, wherein the one or more ingredient valves are umbrella valves.

8. The beverage dispensing system of claim 1, wherein the ingredient pumps are peristaltic pumps.

9. The beverage dispensing system of claim 1, further comprising an output compensator that is fluidly coupled to the dispensing manifold, wherein the output compensator is configured to restrict flow of a beverage based on a pressure of the beverage at the output compensator.

10. The beverage dispensing system of claim 1, further comprising a shell configured to house the ingredient pumps, wherein the shell further includes one or more slots configured to removeably receive and support one or more cartridges containing the ingredients, wherein the one or more cartridges are the ingredient sources that correspond to the one or more ingredient pumps.

11. The beverage dispensing system of claim 10, wherein the one or more slots are arranged in-line such that the one or more cartridges are arranged parallel to one another within the shell.

12. The beverage dispensing system of claim 1, wherein the one or more ingredient pumps, the dispensing manifold, and the controller are all contained within a housing.

13. The beverage dispensing system of claim 1, further comprising a refill port, wherein the controller is further configured to, based on receiving a refill command, operate the one or more ingredient pumps in reverse to pump an ingredient from the refill port to one or more of the ingredient sources.

14. A method of dispensing a beverage, comprising:

receiving a recipe from a user, wherein the recipe indicates an amount of each ingredient from one or more ingredient sources;

operating the one or more ingredient pumps to inject one or more of the ingredients into a holdup volume in a dispensing manifold according to the recipe;

opening a dispensing valve to allow a volume of beverage from a beverage source to flow through the dispensing valve and into the dispensing manifold, allowing the volume of beverage to mix with the holdup volume in the dispensing manifold; and closing the dispensing valve based on a period of time or a detected volume of beverage.

15. The method of claim 14, further comprising:

verifying the recipe after receiving the recipe from the user by comparing an amount of one or more of the ingredients to a predetermined value or a predetermined range.

16. The method of claim 14, further comprising:

analyzing the recipe after receiving the recipe from the user, to calculate a price associated with the recipe, and charging the calculated price to an account associated with the user or requesting payment from the user prior to operating the one or more ingredient pumps.

17. The method of claim 14, wherein the recipe is received from an electronic device associated with the user, or by a user interface.

18. The method of claim 14, wherein at least one of the ingredients contains alcohol, and the method further comprises:

selecting an amount of one or more of the ingredients based on a ratio of the one or more ingredients to the volume of beverage.

19. The method of claim 14, wherein at least one of the ingredients contains a cannabinoid, and the method further comprises:

selecting a fixed amount of the at least one ingredient containing the cannabinoid, regardless of the volume of beverage.

20. A beverage dispensing system, comprising:

a housing;

a dispensing valve configured to be fluidly coupled to at least one beverage source;

one or more ingredient pumps configured to be fluidly coupled to one or more ingredient sources, wherein each of the one or more ingredient pumps is mounted within the housing, and is configured to pump a corresponding ingredient from a corresponding ingredient source;

a dispensing manifold fluidly coupled to the one or more ingredient pumps, the dispensing manifold having a first holdup volume;

an output compensator fluidly coupled to the dispensing manifold;

a dispensing nozzle; and a controller configured to:

receive a recipe from a user, wherein the recipe indicates an amount of each ingredient of the one or more ingredient sources;

operate the one or more ingredient pumps to inject one or more of the ingredients into the first holdup volume in the dispensing manifold according to the recipe; and open the dispensing valve to allow a volume of beverage from the beverage source to flow through the dispensing manifold, wherein the volume of beverage mixes with the first holdup volume in the manifold, flushes the first holdup volume out of the dispensing manifold, through the output compensator, and out of the dispensing nozzle, and leaves a second holdup volume in the dispensing manifold.

* * * * *